United States Patent
Watanabe et al.

(10) Patent No.: US 10,345,689 B2
(45) Date of Patent: Jul. 9, 2019

(54) LIGHTING DEVICE

(71) Applicant: MAXELL, LTD.

(72) Inventors: Katsuyuki Watanabe, Kyoto (JP); Nobuyuki Kaku, Kyoto (JP); Tatsuya Ishikawa, Kyoto (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 15/773,180

(22) PCT Filed: Nov. 18, 2015

(86) PCT No.: PCT/JP2015/082344
§ 371 (c)(1),
(2) Date: May 3, 2018

(87) PCT Pub. No.: WO2017/085800
PCT Pub. Date: May 26, 2017

(65) Prior Publication Data
US 2018/0348617 A1    Dec. 6, 2018

(51) Int. Cl.
*G02B 5/02*    (2006.01)
*G03B 21/20*   (2006.01)
*F21V 33/00*   (2006.01)
*G02B 5/20*    (2006.01)
*H04N 9/31*    (2006.01)

(52) U.S. Cl.
CPC .......... *G03B 21/2046* (2013.01); *F21V 33/00* (2013.01); *G02B 5/20* (2013.01); *H04N 9/3141* (2013.01); *G02B 5/02* (2013.01)

(58) Field of Classification Search
CPC ........ G03B 21/2046; G02B 5/02; G02B 5/20; H04N 9/3141

USPC ........................................................... 353/87
See application file for complete search history.

(56) References Cited

U.S. PATENT DOCUMENTS

| | | | | |
|---|---|---|---|---|
| 2007/0147053 | A1* | 6/2007 | Gagne | F21V 21/02 362/404 |
| 2015/0168821 | A1* | 6/2015 | Negretti | H05B 37/0227 353/85 |

FOREIGN PATENT DOCUMENTS

| | | | | |
|---|---|---|---|---|
| JP | 05-109309 | A | | 4/1993 |
| JP | 10-149720 | A | | 6/1998 |
| JP | 2003-016831 | A | | 1/2003 |
| JP | 200515310 | A | * | 6/2005 ............... G02F 1/13 |
| JP | 2009-199982 | A | | 9/2009 |
| JP | 2012-186118 | A | | 9/2012 |

OTHER PUBLICATIONS

Machine Translation of JP2005-135310.*
International Search Report of PCT/JP2015/082344 dated Feb. 2, 2016.

* cited by examiner

*Primary Examiner* — Steven Whitesell Gordon
*Assistant Examiner* — Jerry L Brooks
(74) *Attorney, Agent, or Firm* — Mattingly & Malur, PC

(57) ABSTRACT

Provided is a video-image-projecting-function-equipping lighting device having favorable usability for a user. The lighting device has: a lighting unit for emitting illumination light; a projection type video image display unit for projecting a video image; and also a structure of suspending the lighting device from a ceiling surface so as to make its horizontality adjustable, and the projection type video image display unit displays an image for guiding the adjustment of the horizontality.

10 Claims, 28 Drawing Sheets

FIG. 2
(A)
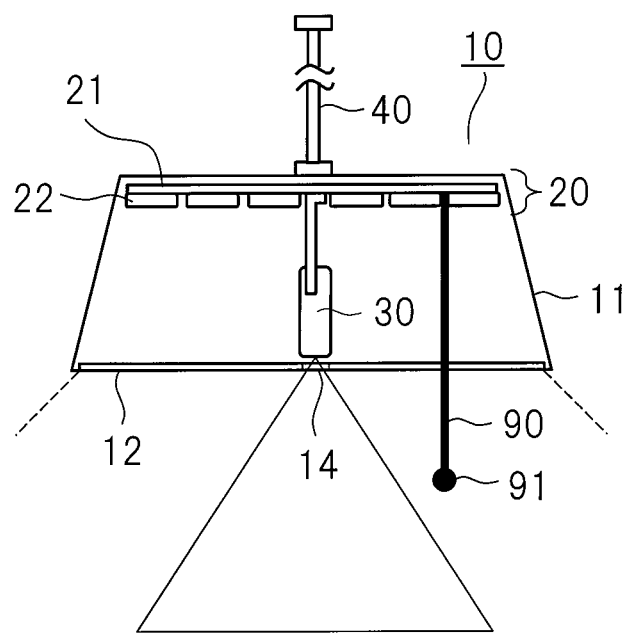
(B)
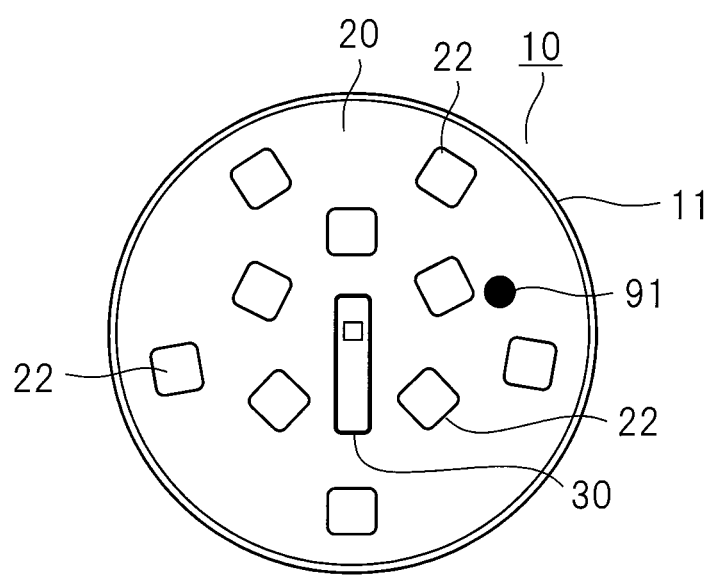

FIG. 6
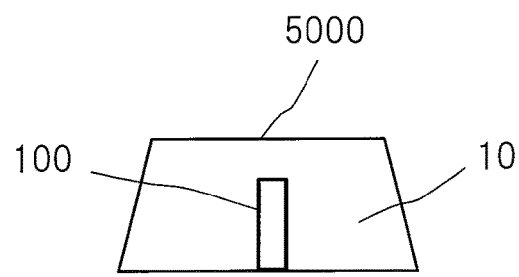
(A)
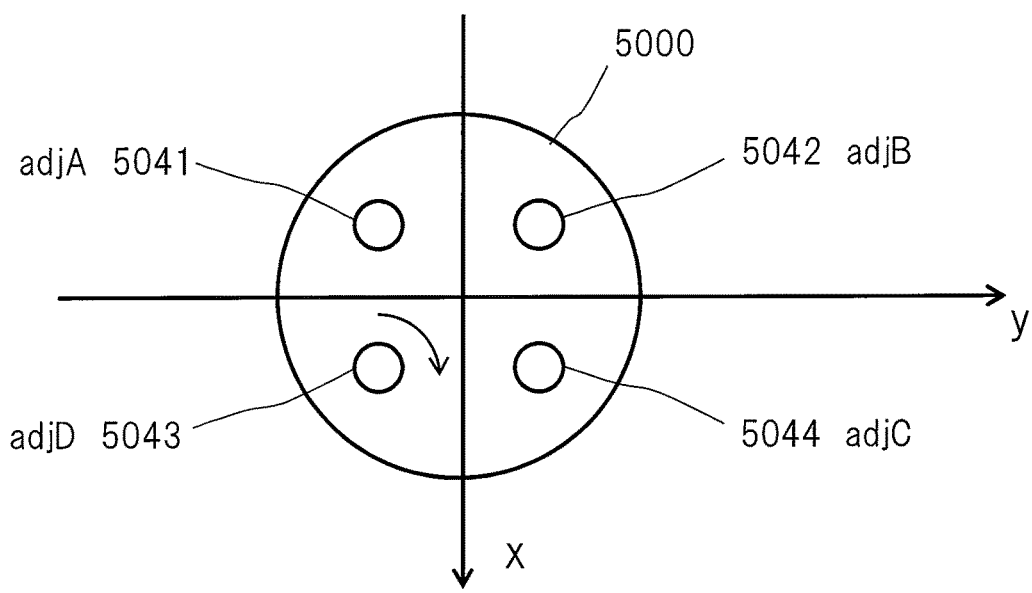
(B)

FIG. 7
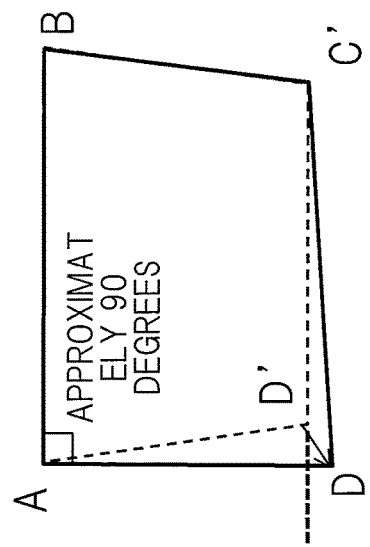
(A)
BEFORE ADJUSTMENT
(WHEN INCLINED TO X-DIRECTION)
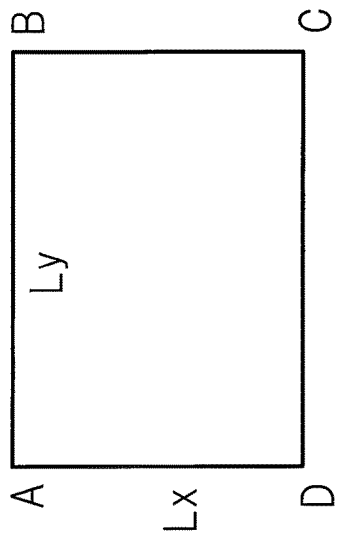
(B)
APPROXIMATELY 90 DEGREES
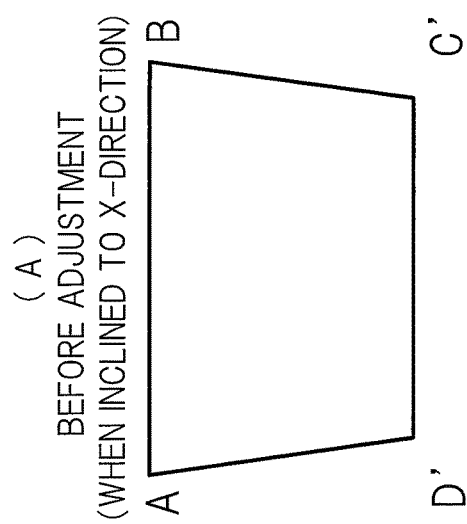
(C)
AFTER ADJUSTMENT
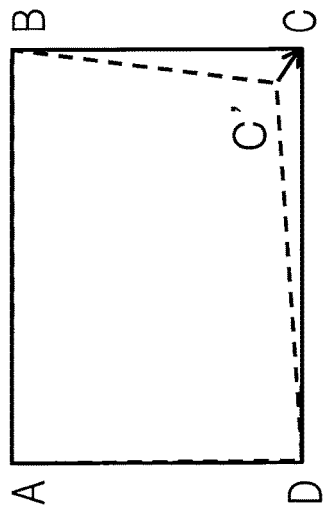
(D)
STATE WHERE HORIZONTALITY IS MAINTAINED (NORMAL STATE)

FIG. 8
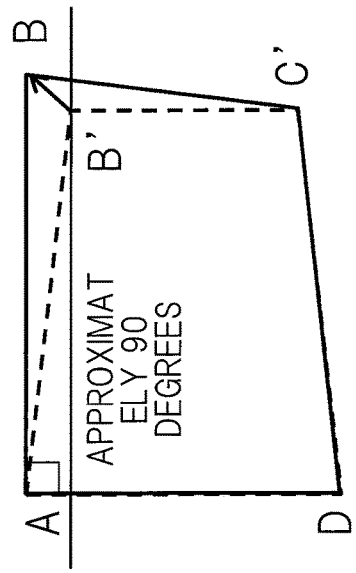
(A)
BEFORE ADJUSTMENT
(WHEN INCLINED TO Y-DIRECTION)
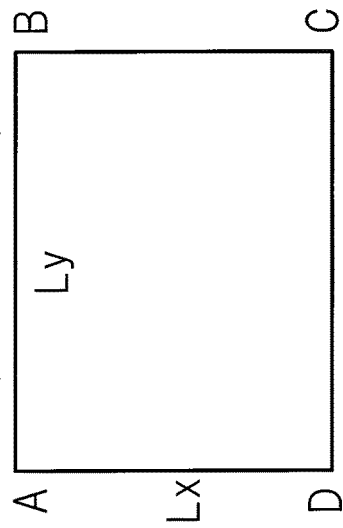
(B)
APPROXIMATELY 90 DEGREES
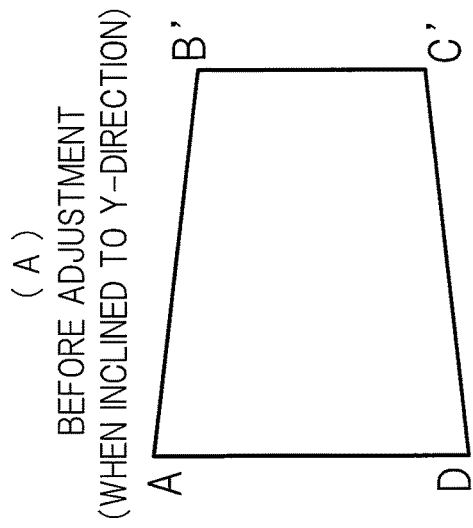
(C)
AFTER ADJUSTMENT
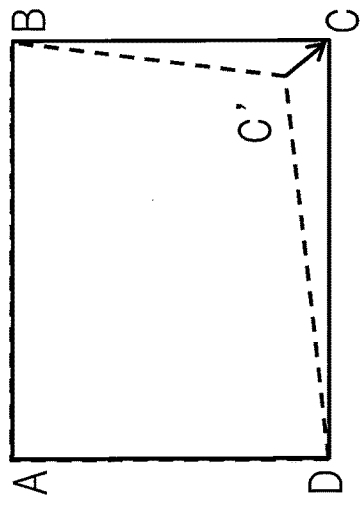
(D)
STATE WHERE HORIZONTALITY IS MAINTAINED (NORMAL STATE)

FIG. 9
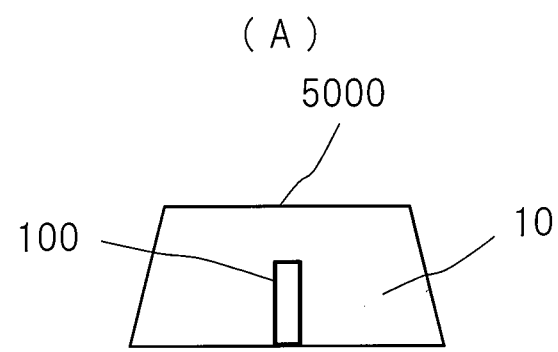
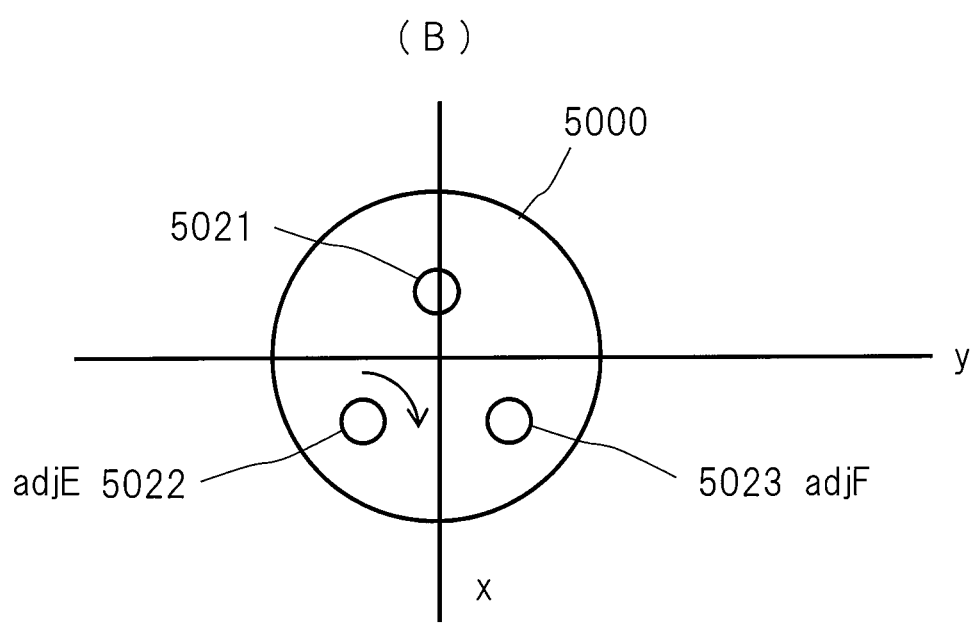

FIG. 10
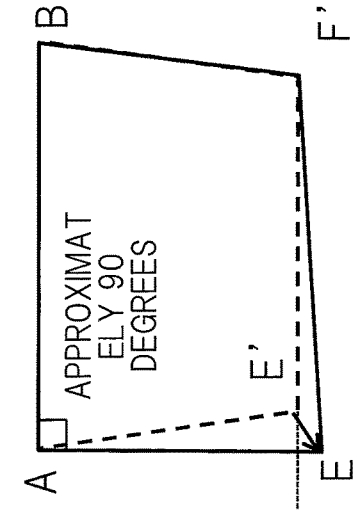
(A)
BEFORE ADJUSTMENT
(WHEN INCLINED TO X-DIRECTION)
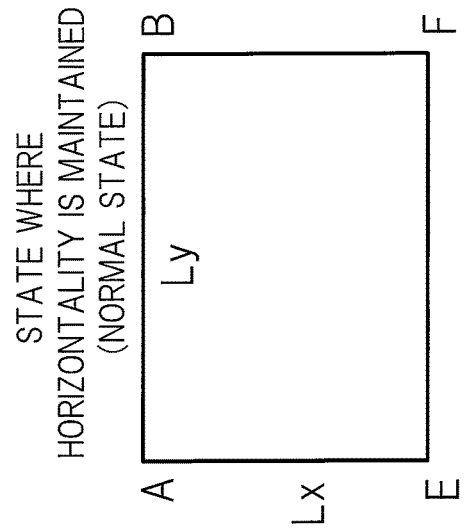
(B)
APPROXIMATELY 90 DEGREES
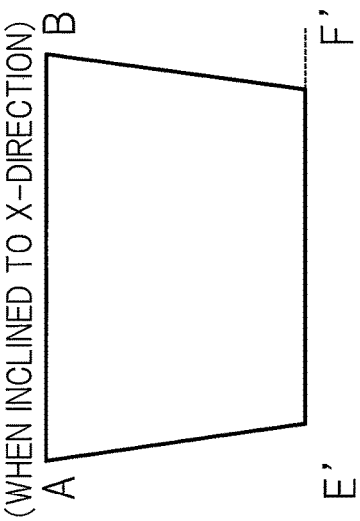
(C)
AFTER ADJUSTMENT
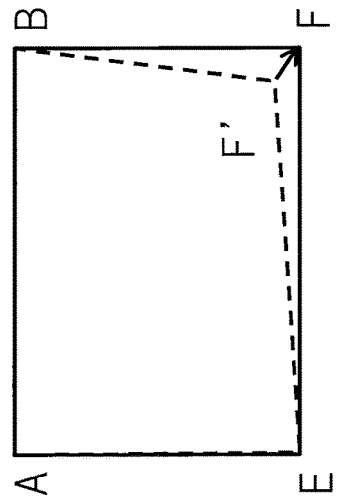
(D)
STATE WHERE HORIZONTALITY IS MAINTAINED (NORMAL STATE)

FIG. 11
(A)
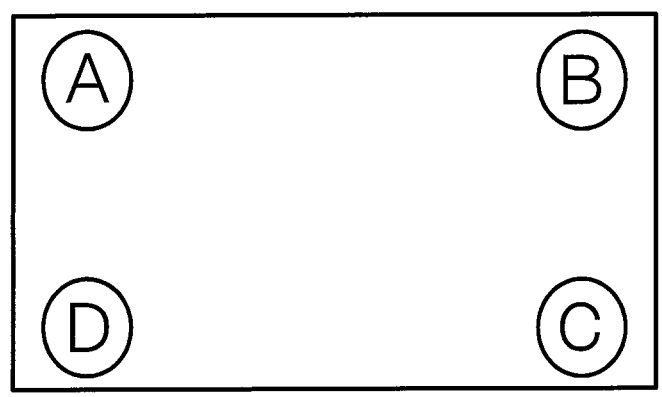
(B)
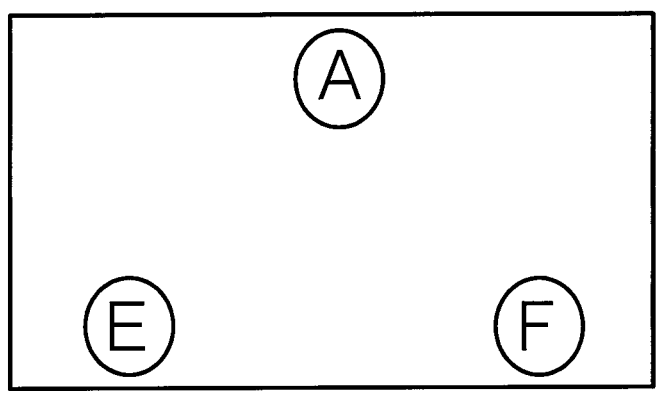

FIG. 16
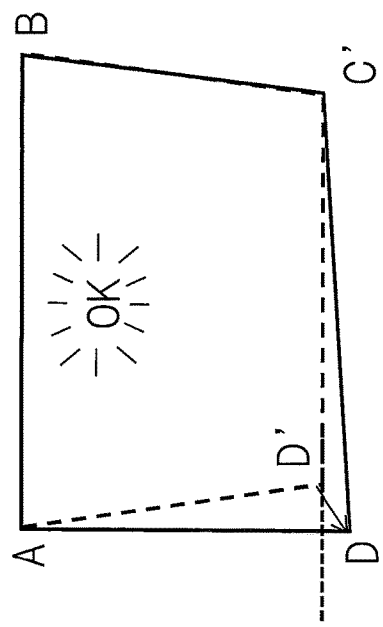
(A)
BEFORE ADJUSTMENT
(WHEN INCLINED TO X-DIRECTION)
NG
PLEASE ROTATE adjD
BUTTON CLOCKWISE.
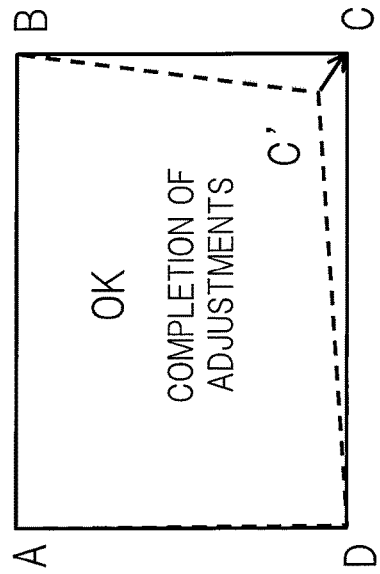
(B)
OK
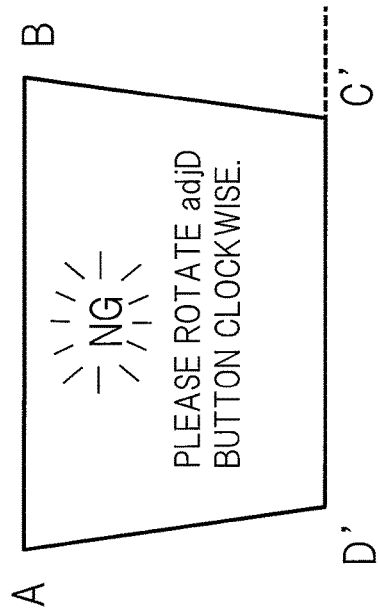
(C)
NG
PLEASE ROTATE adjC
BUTTON CLOCKWISE.
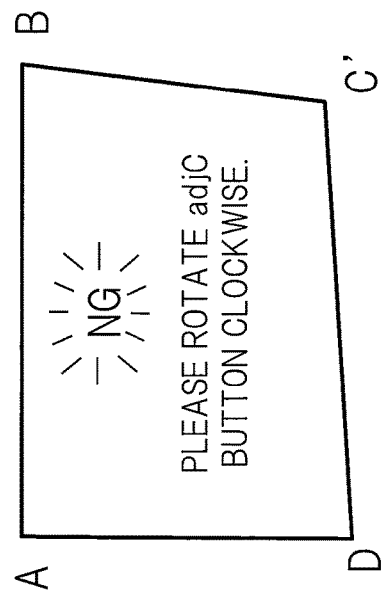
(D)
OK
COMPLETION OF
ADJUSTMENTS FIG. 17
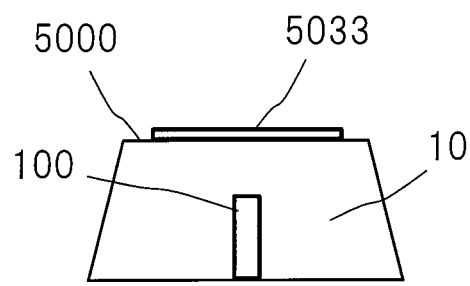
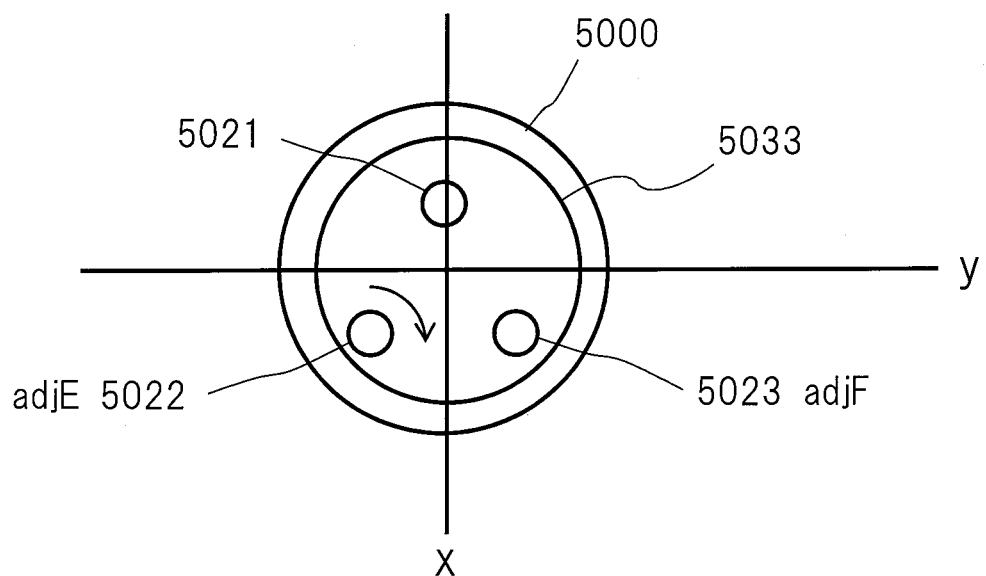

LIGHTING DEVICE

TECHNICAL FIELD

The present invention relates to a lighting device.

BACKGROUND ART

Known as a lighting device used by attachment to a ceiling has been a suspending-type (or referred to also as pendant-type) lighting device that is disclosed in, for example, Patent Document 1 (Japanese Patent Application Laid-open No. H5-109309) and that is used by utilizing a power supply line preliminarily attached to the ceiling and by being suspended from the ceiling. Moreover, a technique for attaching, to a ceiling light, a communication functional module that is capable of utilizing various functions and that is attached to a ceiling or a wall surface has been disclosed Patent Document 2 (Japanese Patent Application Laid-open No. 2003-16831).

RELATED ART DOCUMENTS

Patent Documents

Patent Document 1: Japanese Patent Application Laid-open No. H5-109309
Patent Document 2: Japanese Patent Application Laid-open No. 2003-16831

SUMMARY OF THE INVENTION

Problems to be Solved by the Invention

However, Patent Document 1 has not disclosed anything about incorporating a projector integrally into, particularly, the suspending-type lighting device to carry out lighting of the projector and light emission a light source for illumination light and about such a device. Moreover, also in Patent Document 2, only a block diagram and a schematic outer shape of a projector have been disclosed, and nothing has been disclosed about a technique in which optical characteristics and performance of the projector integrally incorporated into, particularly, the above-mentioned suspending-type lighting device are taken into consideration.

In other words, problems to be detailed also later when the projector is integrally incorporated into the lighting device, particularly, a suspending-type lighting device have not been sufficiently considered yet in the above-mentioned conventional techniques.

Therefore, the present invention has been achieved in view of the problems in the above-mentioned conventional techniques, and its object is to provide a video-image-projecting-function-equipping lighting device which has favorable usability for a user(s).

Means for Solving the Problems

As one aspect for achieving the above purpose, a lighting device may include: a lighting unit emitting illumination light; and a projection type video image display unit projecting an image, in which the lighting device has a structure of suspending the lighting device from a ceiling surface at least at three points or more, the structure being capable of adjusting horizontality of the lighting device, and the projection type video image display unit has a function of displaying an image for guiding the adjustment of the horizontality with respect to a projection surface of the lighting device attached to the ceiling surface.

According to the present invention, a video-image-projecting-function-equipping lighting device, which has favorable usability for a user(s), can be provided.

BRIEF DESCRIPTIONS OF THE DRAWINGS

FIG. 1 is a perspective view showing an appearance configuration of a lighting device according an embodiment of the present invention together with its use environment;

FIGS. 2(A) and (B) are a side face view and a lower face view that explain one example of layout (arrangement) of an optical unit and an illumination light source in a housing of the lighting device according to the embodiment of the present invention;

Figure 12:
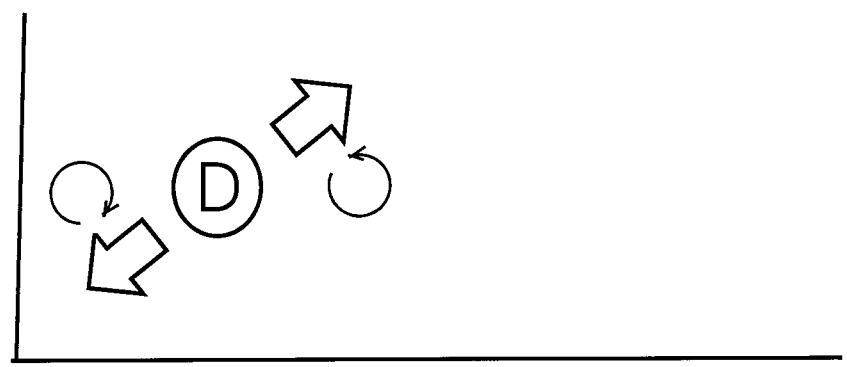
Figure 14:
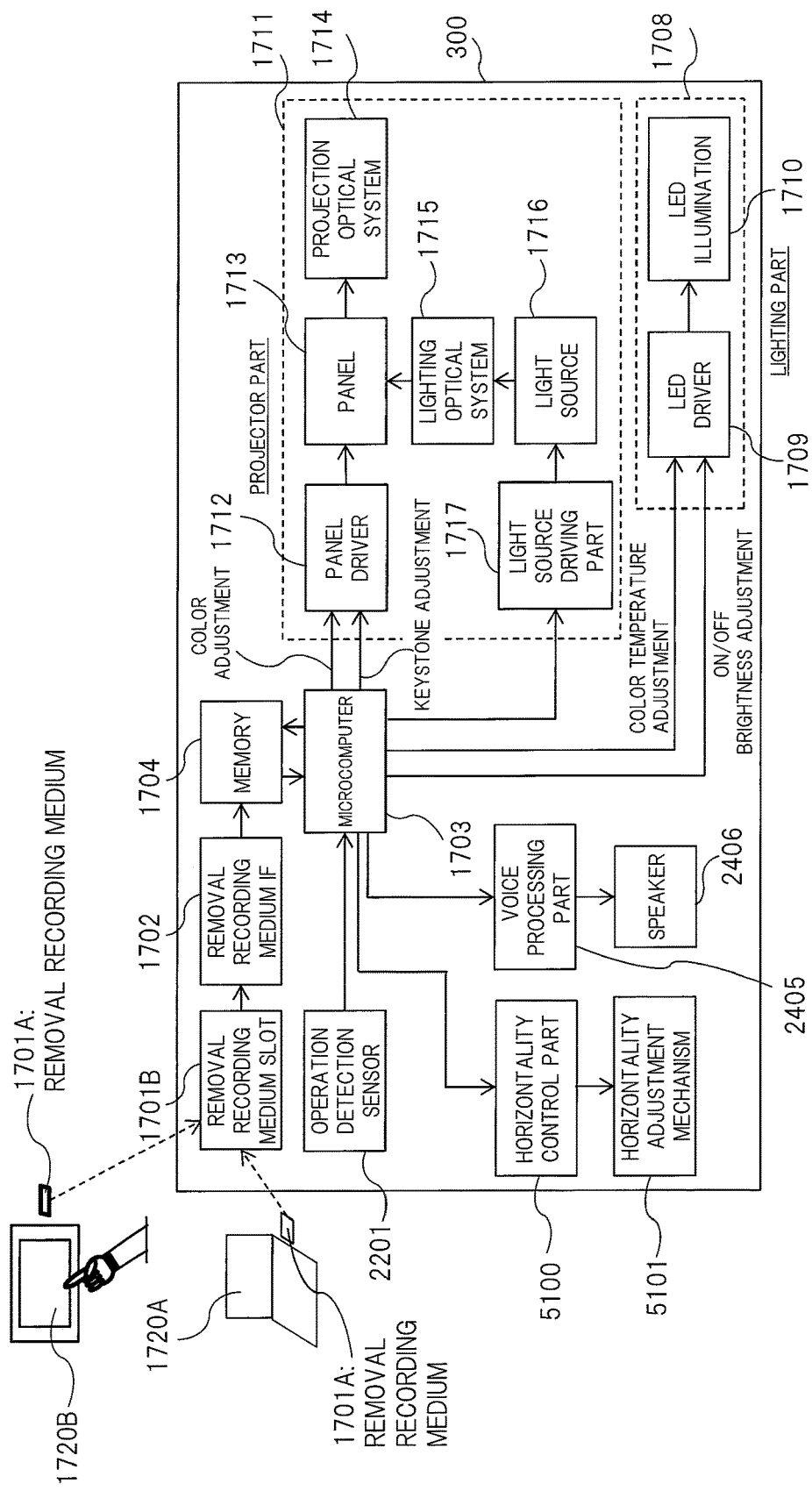
Figure 15:
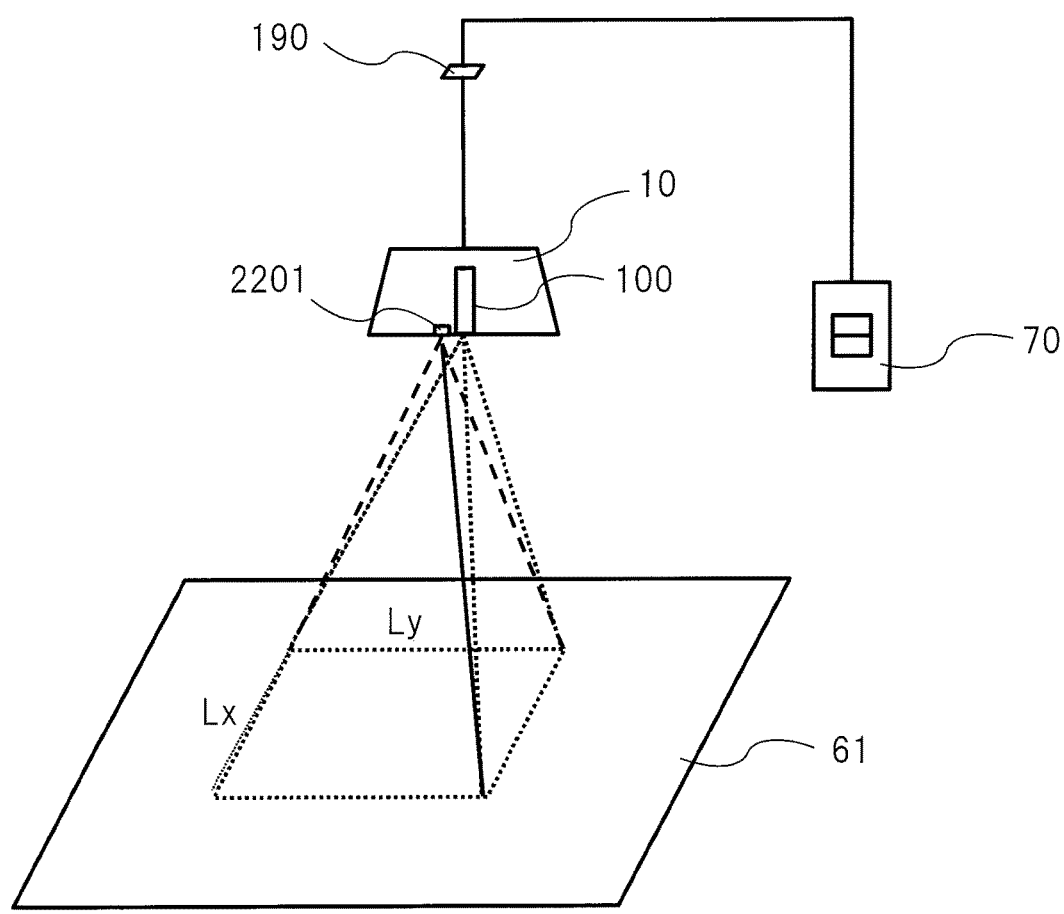
Figure 19:
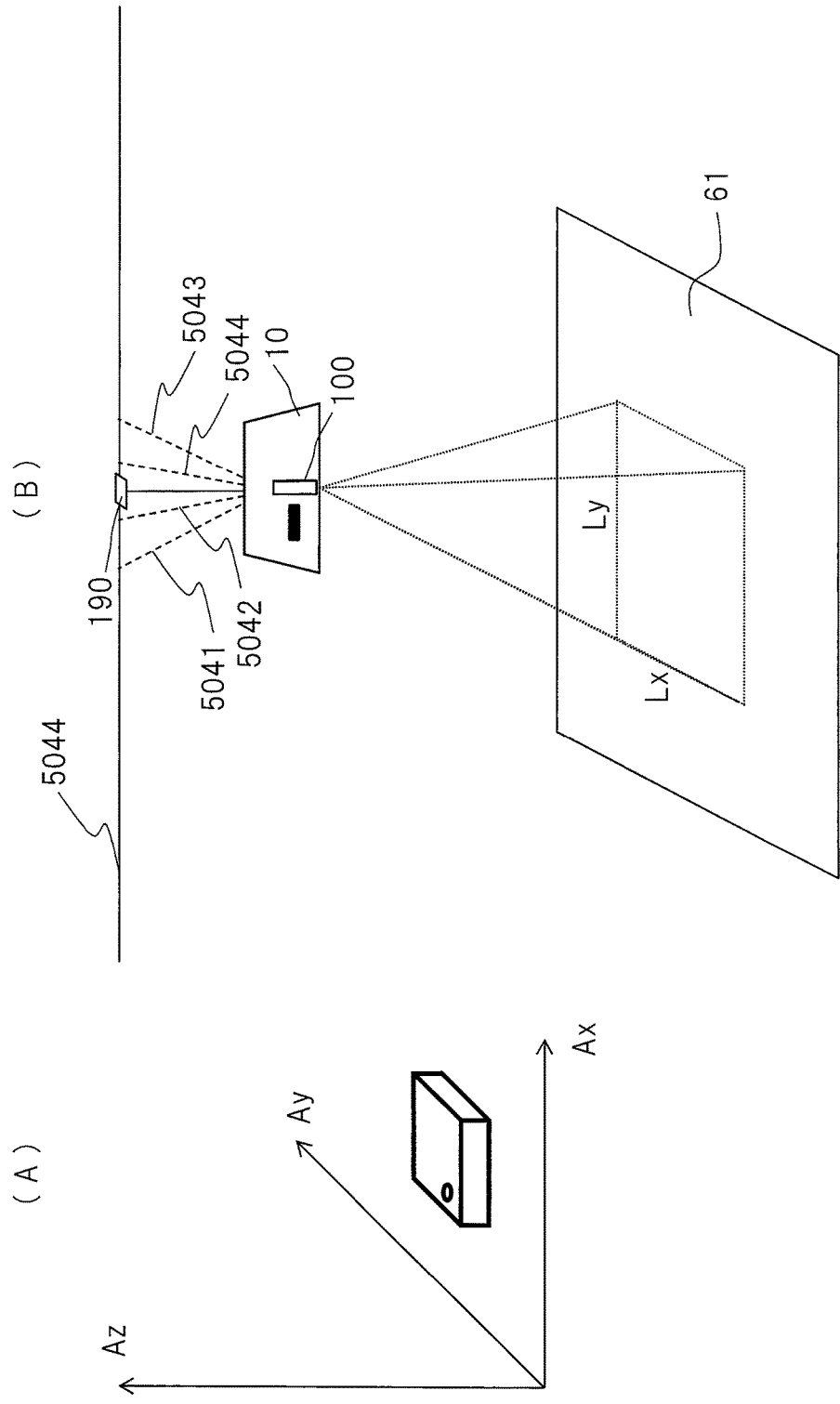
Figure 22:
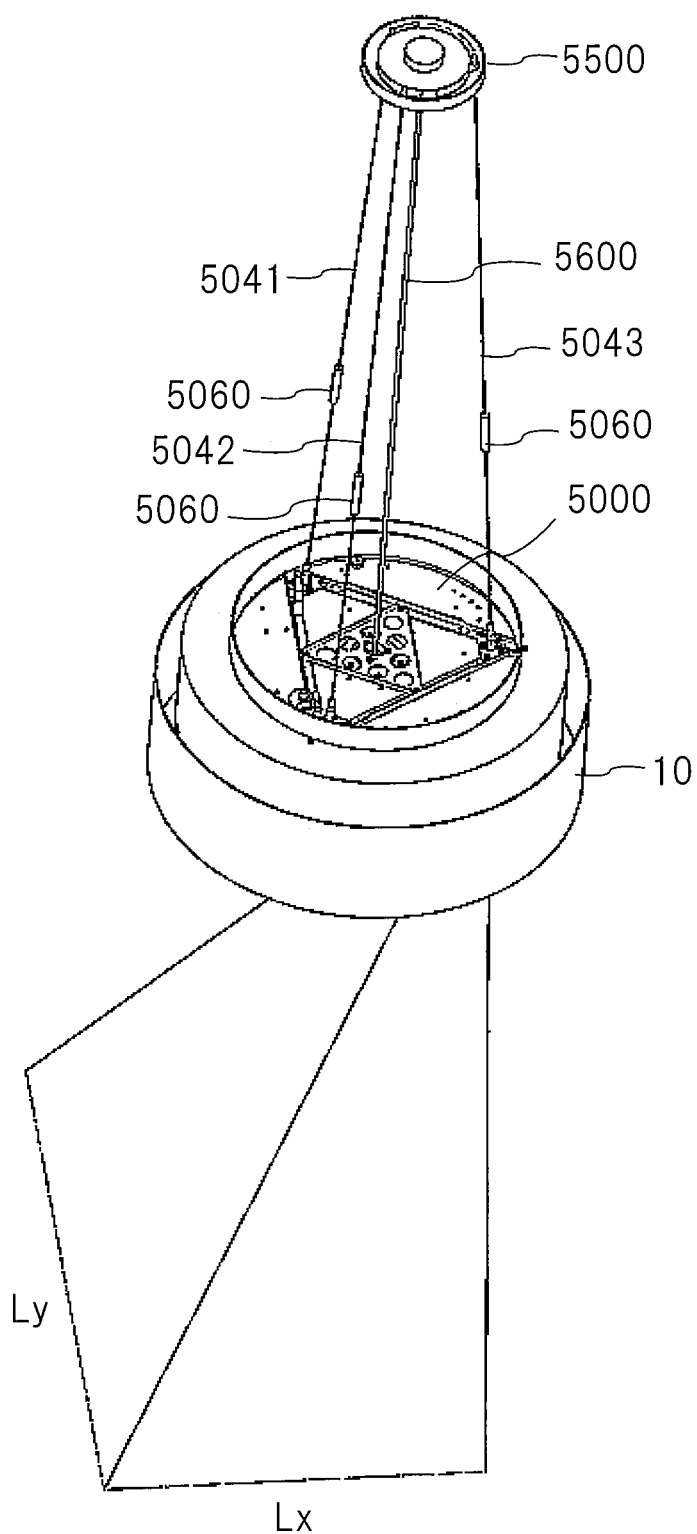
Figure 23:
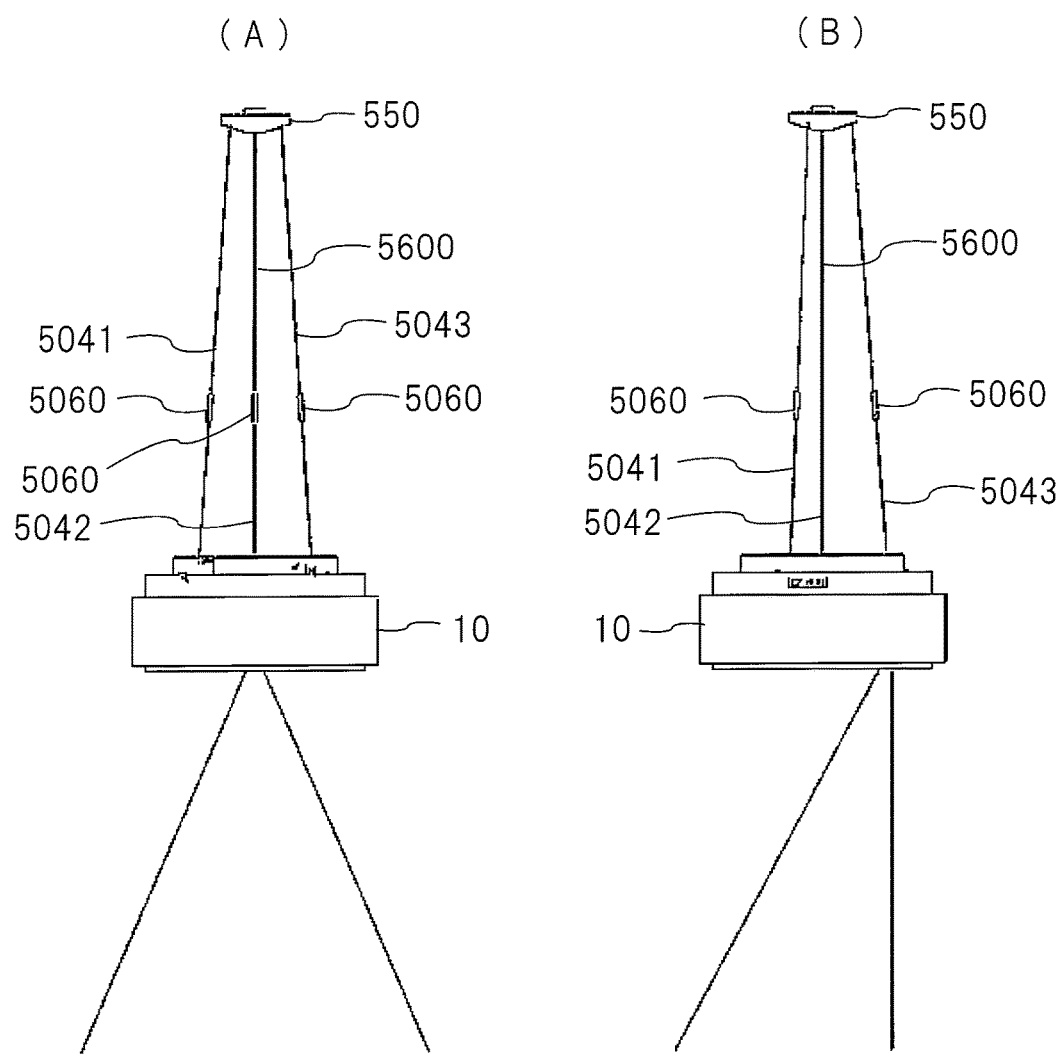
Figure 24:
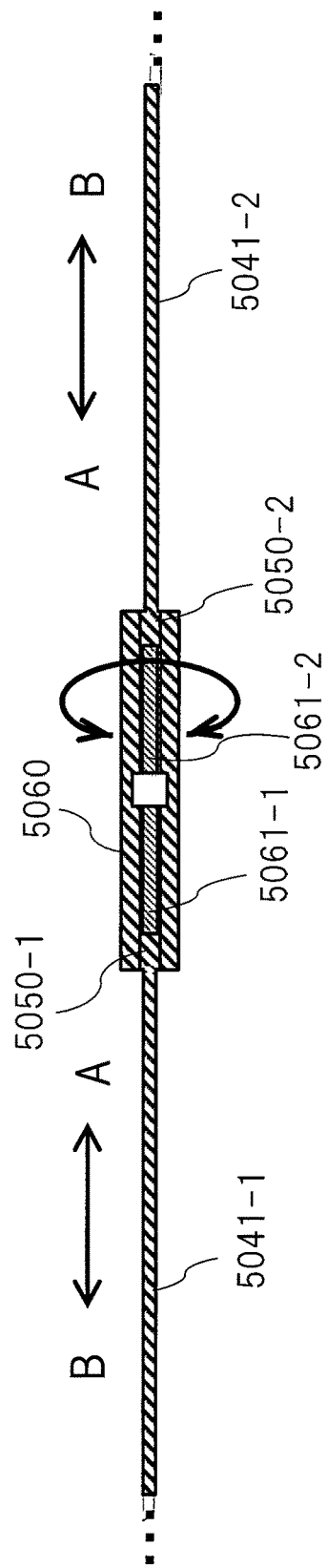
Figure 25:
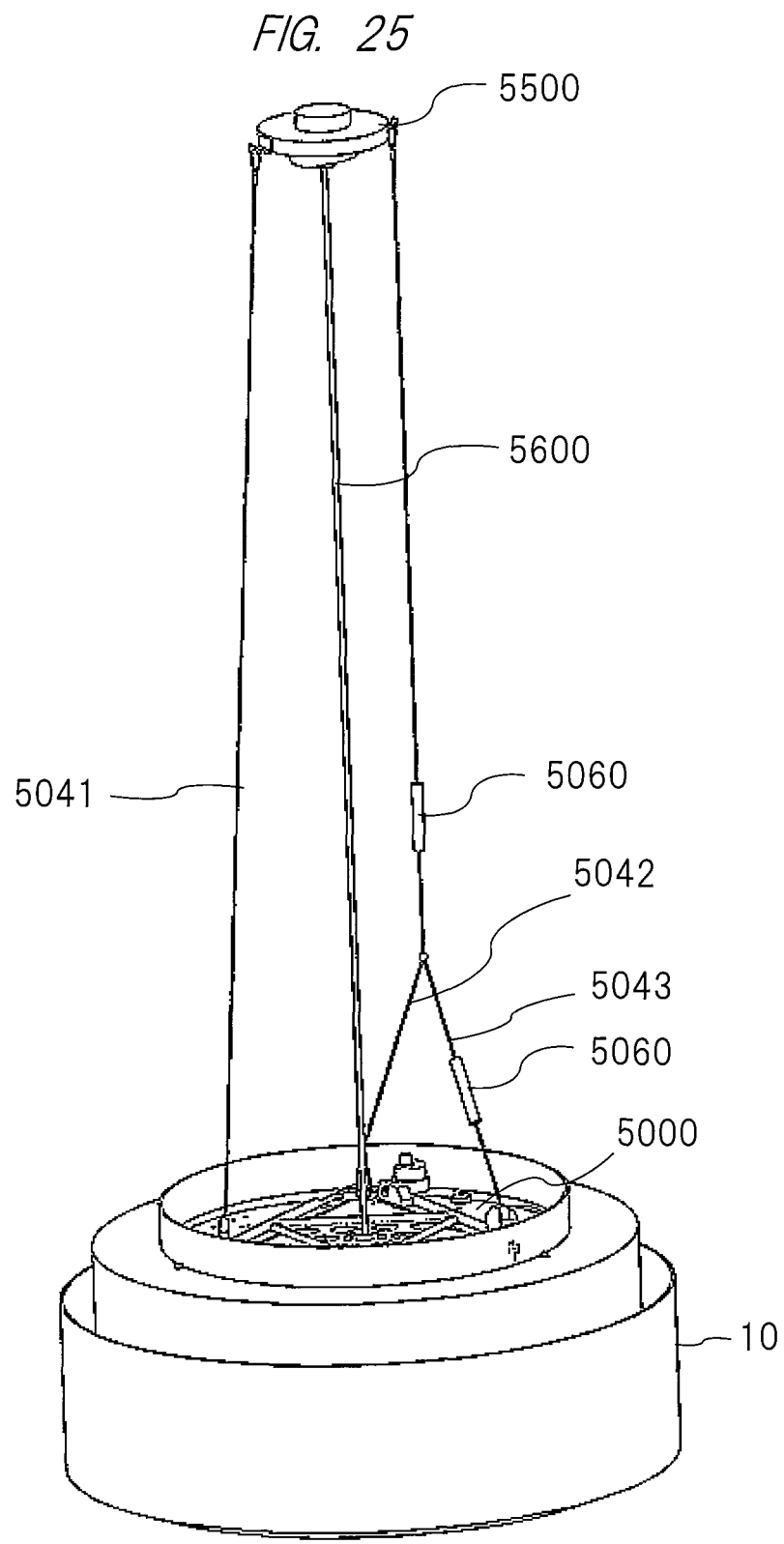
Figure 26:
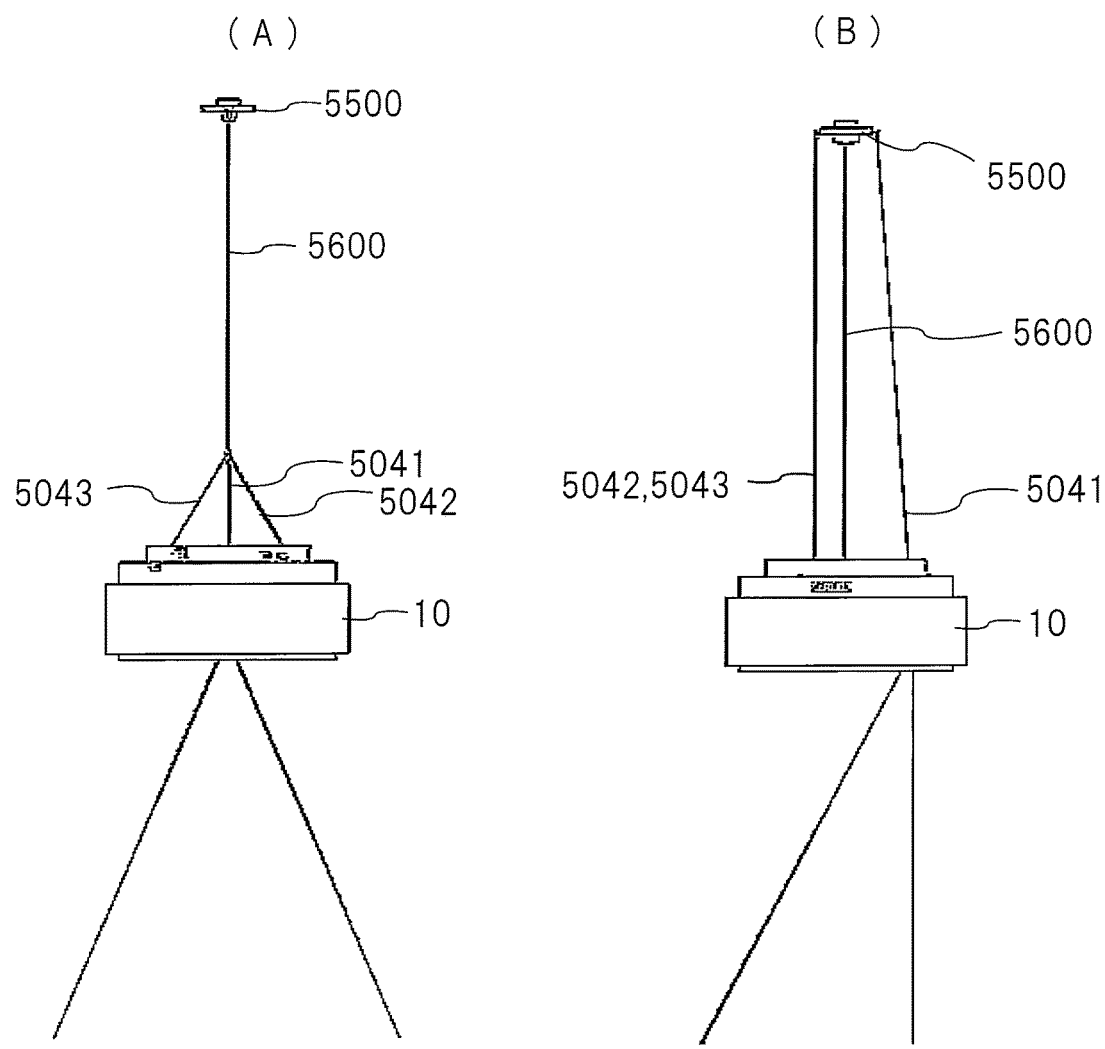
Figure 27:
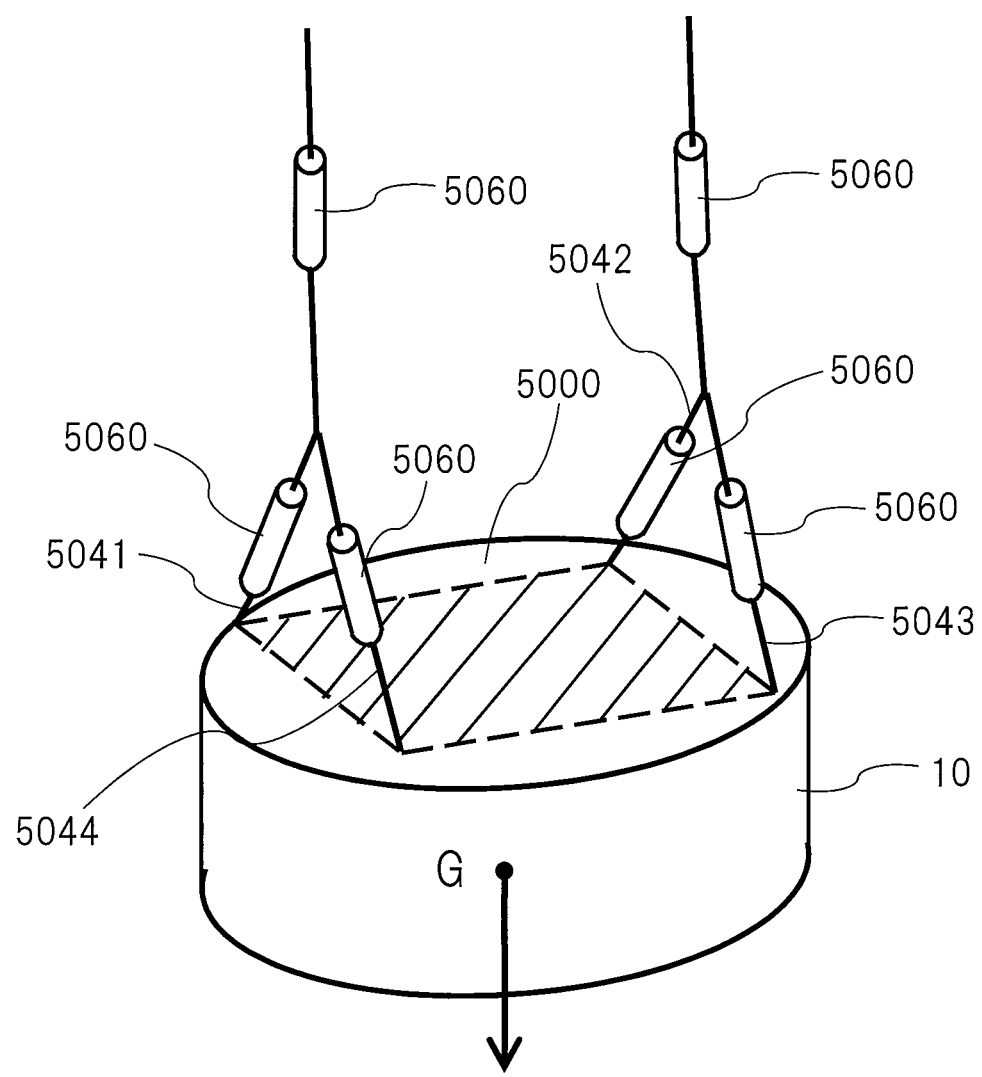
Figure 28:
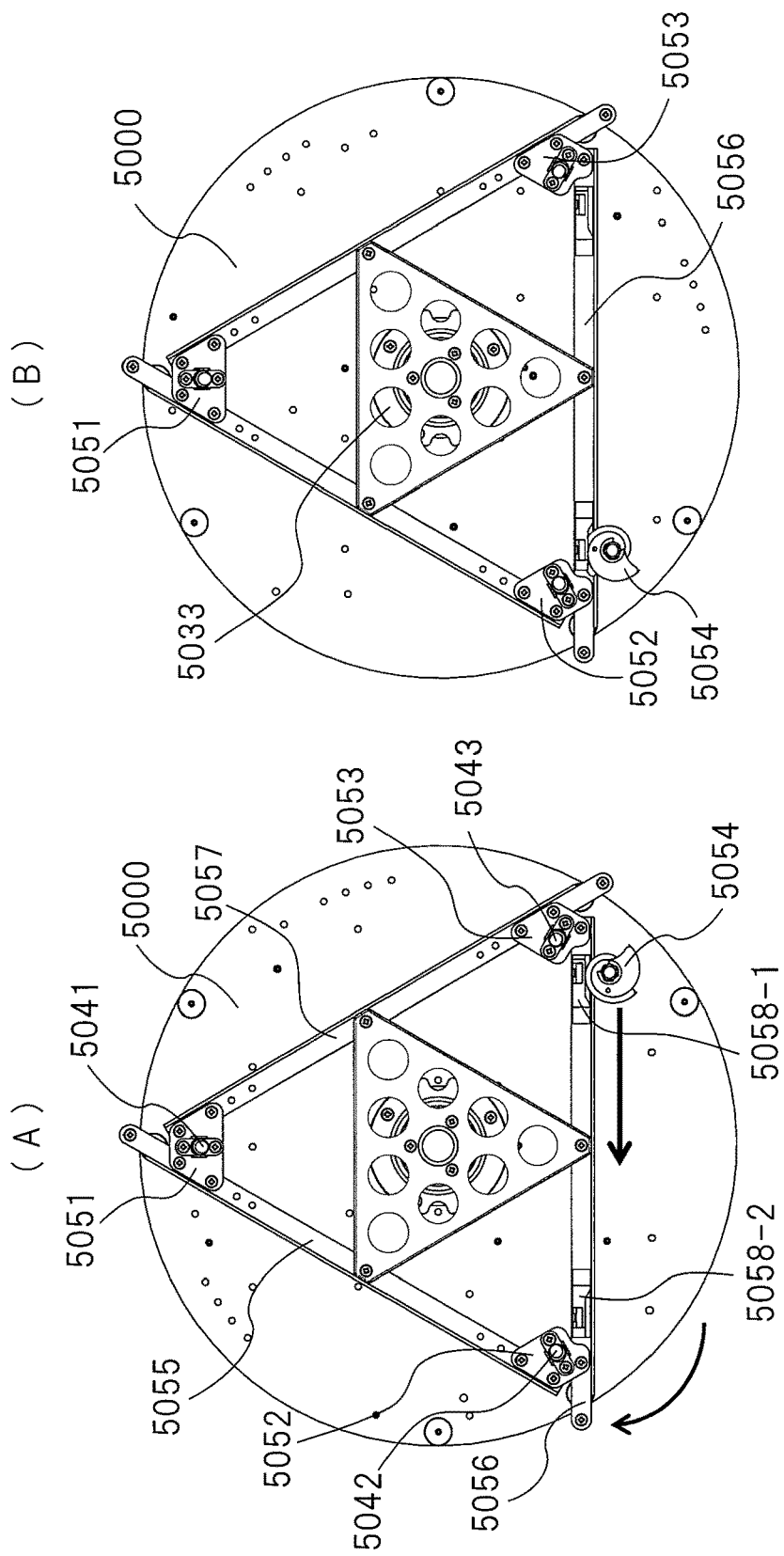

FIGS. 6(A) and (B) are a side face view and an upper face view that explain the horizontality adjustment mechanism of the lighting device according to the embodiment of the present invention;

FIG. 7(A) to (D) are views that explain adjustment of an inclination in an x-coordinate direction according to the above horizontality adjustment mechanism;

FIG. 8(A) to (D) are views that explain adjustment of an inclination in a y-coordinate direction according to the horizontality adjustment mechanism;

FIGS. 9(A) and (B) are a side face view and an upper face view that explain another horizontality adjustment mechanism of the lighting device according to the embodiment of the present invention;

FIG. 10(A) to (D) are views that explain adjusting processes by another horizontality adjustment mechanism mentioned above;

FIGS. 11(A) and (B) are views that show one example of a display screen used in the adjustment by the above-mentioned horizontality adjustment mechanism;

FIG. 12 is a view showing another example of the display screen for use in adjustments by the above-mentioned horizontality adjustment mechanism;

FIG. 13(A) to (C) are explain an automated horizontality adjustment mechanism of a lighting device according to the embodiment of the present invention, and show an upper face view of the lighting device, a projection image of a projection type video image display unit, and an operation panel;

FIG. 14 is a view that shows one example of a configuration for adjustment utilizing an interactive function of the lighting device according to the embodiment of the present invention is utilized;

FIG. 15 is a perspective view that shows an appearance configuration of the lighting device in which the above-mentioned interactive function is utilized;

FIG. 16(A) to (D) are views that show an example of adjusting processes of the horizontality adjustment mechanism of the lighting device in which the above-mentioned interactive function is utilized;

FIGS. 17(A) and (B) are views showing another example of the horizontality adjustment mechanism of the lighting device in which the above-mentioned interactive function is utilized;

FIGS. 18(A) and (B) are views that show an example of adjusting processes of another horizontality adjustment mechanism of the lighting device in which the above-mentioned interactive function is utilized;

FIGS. 19(A) and (B) show an example in which a gravity sensor used in the lighting device utilizing the above-mentioned interactive function is mounted in the lighting device;

FIGS. 20(A) and (B) are views that show one example of a display in a case of utilizing the gravity sensor in the above-mentioned lighting device;

FIGS. 21(A) and (B) show another example of a display in a case of utilizing a gravity sensor in the above-mentioned lighting device;

FIG. 22 is a perspective view showing the lighting device according to the embodiment of the present invention, the lighting device having a horizontally-adjustable attaching (suspending) structure (three-point stopping structure);

FIGS. 23(A) and (B) are a front view and a side view showing the lighting device having the horizontally-adjustable attaching (suspending) structure;

FIG. 24 is a partially enlarged cross-sectional view enlargedly showing one portion of a member forming the above horizontally-adjustable attaching (suspending) structure;

FIG. 25 is a perspective view showing a lighting device having another horizontally-adjustable attaching (suspending) structure (three-point stopping structure);

FIGS. 26(A) and (B) are a front view and a side view showing a lighting device having another horizontally-adjustable attaching (suspending) structure (three-point stopping structure);

FIG. 27 is a perspective view showing a lighting device provided with still another horizontally-adjustable attaching (suspending) structure (four-point stopping structure); and FIGS. 28(A) and (B) are upper face views showing one example of an adjusting mechanism of a rotation angle of a lighting device according to the embodiment of the present invention.

DETAILED DESCRIPTION OF PREFERRED EMBODIMENTS

Hereinafter, embodiments of the present invention will be described in detail with reference to the accompanying drawings.

<Pendant-Type Lighting Device with a Video Image Projecting Function>

Figure 1:
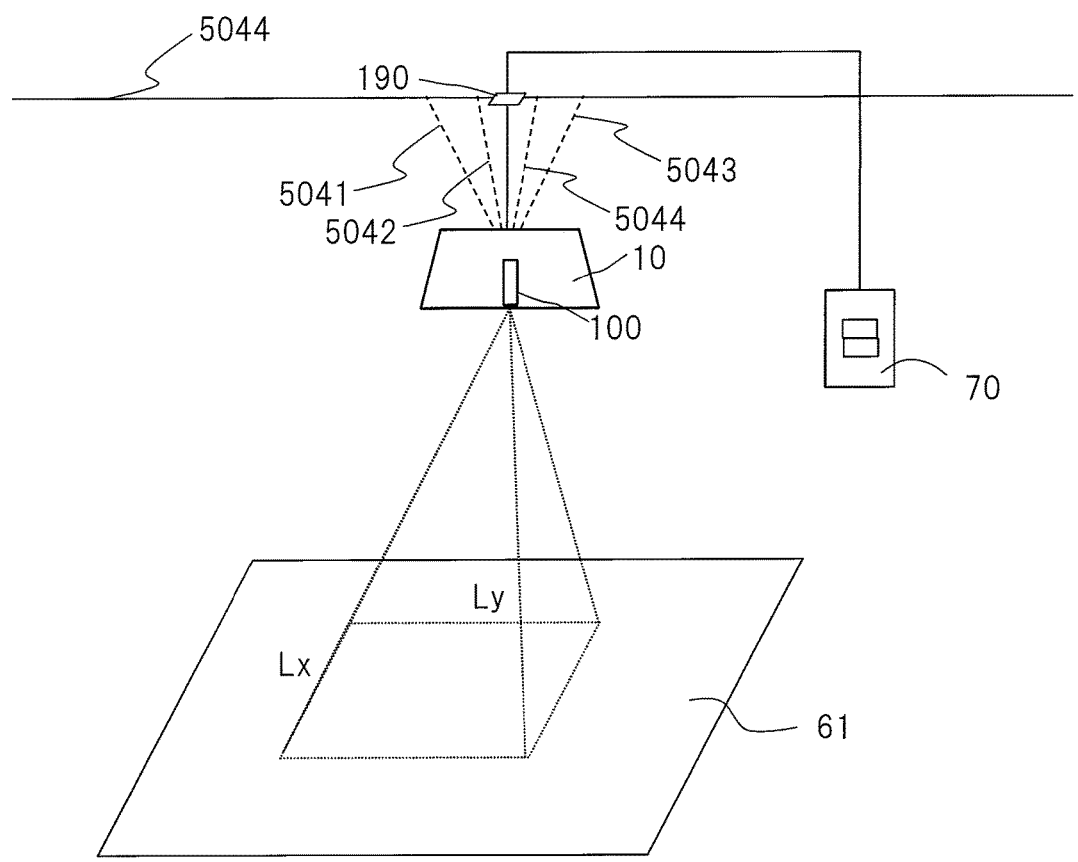

First, accompanying FIG. 1 shows an appearance configuration of a lighting device with video image projecting function according to one embodiment of the present invention. That is, FIG. shows the video-image-projecting-function-equipping lighting device mounted on a so-called pendant-type lighting device attached in a manner so as to be suspended from a ceiling surface.

As clearly indicated by FIG. 1, a video-image-projecting-function-equipping lighting device 10 according to the present embodiment is attached to a ceiling surface 5044 or the like forming a space such as a kitchen, dining room, or living room, or an office and is utilized. More specifically, as shown also in FIG. 1, the device is installed at a predetermined height above a table, a desk, or the like installed in a room. This video-image-projecting-function-equipping lighting device 10 is a lighting device having both of an illuminating function of emitting illumination light onto an upper face of a table or desk, a wall surface, or the like and a video image projecting function of projecting various video images onto the upper face (display surface or projection surface) 61 of the above table, desk, or the like and of displaying them. Incidentally, reference numerals 5041 to 5044 in FIG. 1 show holders for holding the pendant-type lighting device 10 in a suspended state at a predetermined position from the ceiling surface 5044, and detailed descriptions thereof will be also given later. Moreover, the video-image-projecting-function-equipping lighting device 10 mounts therein a projection type video image display unit 100 (incidentally, wholly indicated by reference numeral 100 in this case) described later in detail.

There is a high possibility that a horizontal surface table, desk, or the like onto which a user desires to project a video image(s) by the video image projecting function will become an object to be illuminated by the illuminating function in a state or the like of having no video image projecting function. Therefore, an area projecting the video image by the video image projecting function is desirably overlapped, at least partly, with an illumination range by the illumination light of the illuminating function. Incidentally, in this drawing, an x-axis direction and a y-axis direction of a projection surface projected onto the display surface 61 are indicated by Lx and Ly.

Moreover, the video-image-projecting-function-equipping lighting device 10 is desirably configured so that the illumination light of the illuminating function and the video image projected by the video image projecting function can be ON/OFF-controlled respectively by mounting various controlling parts described later.

Moreover, an operation signal from an operation panel 70 (wall-surface operation input part) attached to a wall or the like is transmitted to the various controlling parts of the video-image-projecting-function-equipping lighting device by a cable or wireless, and the illumination light of the illuminating function and the video image projected by the video image projecting function may be ON/OFF-controlled. Furthermore, reference numeral 190 represents an outlet for supplying, to the lighting device 10, power from a commercial power supply, and the operation signal from the operation panel 70, and the like.

Next, FIG. 2 shows specific layout (arrangement) of an optical unit 30 and the illumination light source constituting the projection type video image display unit 100 of the above video-image-projecting-function-equipping lighting device 10. Incidentally, in an example of this drawing, the entire illumination light source including an aggregate of a plurality of semiconductor light emitting elements (LED) 22 is explained as an illumination light source 20.

FIG. 2(A) and FIG. 2(B) are a side-face cross-sectional view and a lower face view showing the pendant-type video-image-projecting-function-equipping lighting device 10. In this example, the optical unit 30 is disposed at vertical layout. Moreover, attached onto a bottom face inside a housing (shade) 11 serving as a main body is a substrate 21 of an illumination light source 20 provided with a plurality of semiconductor light emitting elements (LED) 22. Furthermore, a diffusion plate 12 is attached onto an opening surface on a lower side of FIG. 2(A) so as to cover this opening surface.

Moreover, the optical unit 30 is disposed in a space formed by the housing (shade) 11 and the diffusion plate 12 so as to be positioned substantially in a center portion of illumination bundle of light beams. In an example of this drawing, a position in the diffusion plate 12 to which projection light is emitted downward from the optical unit 30 is provided with an opening part or a transmission window 14. This is because if diffusion effects are exerted on the entire surface of the diffusion plate 12 without providing the opening part or the transmission window, a projection video image(s) emitted from the optical unit 30 is also diffused, and no video image can be formed on a video-image-projection target surface such as a table or desk.

A portion of the opening part or the transmission window 14 may be an opening formed by cutting out the diffusion plate 12, or may be a transmissible substance such as glass having no diffusion effects. The transmission window formed by the transmissible substance or the like can have a configuration in which it is difficult for dusts or the like to enter an interior of the diffusion plate 12. However, in order not to affect the projection video images emitted from the optical unit 30 as much as possible, a coating process should be carried out thereon so as to make spectral characteristics as flat as possible in a wavelength range that the projection light emitted from the optical unit 30 has.

Incidentally, a periphery of the opening part or the transmission window 14 is not necessarily required to be directly connected to the diffusion plate 12 and, in order that a shade of the optical unit 30 on the diffusion plate 12 is difficult to view, an area formed by a decorative plate or the like may be provided between the opening part or transmission window 14 and the diffusion plate 12. In other words, the opening part or the transmission window 14 is a passage opening or a transmission opening required for emitting video image projection light projected from the optical unit 30 disposed in a space formed by the housing (shade) 11 and the diffusion plate 12, and its position may be set on the diffusion plate 12, or may be on one portion of another structure.

In accordance with such layout (arrangement), since the optical unit 30 can be thinned in a direction in parallel with the horizontal surface of the optical unit 30, a ratio of the shade formed by the optical unit 30 can be made smaller than an irradiation area from the illumination light source 20 to the diffusion plate 12. This makes it possible to inhibit deterioration (that is, a sense of discomfort with respect to the lighting device due to an influence brought by the shade on the diffusion plate 12) in a grade due to an influence brought by the shade of the optical unit 30 formed on the diffusion plate 12. Moreover, even when the above-mentioned housing (shade) 11 is formed by the diffusion plate, the shade of the optical unit 30 becomes inconspicuous, which makes it possible to inhibit the deterioration in the grade in appearance of the lighting device.

Incidentally, FIG. 2 shows an example of attaching a string-pulling type toggle switch besides. In FIG. 2, a string part 90 (which may be constituted by fibers, a metal chain, a synthetic resin chain, or the like) and a tip part 91 of the string-pulling type toggle switch are shown. When the string-pulling type toggle switch is attached, as shown in FIG. 2, it is desirable to make layout so that the tip part 91 is located within a diffusion range of illumination light of the illumination light source 20 and outside an irradiation region of the projection video image emitted from the optical unit 30 of the projection type video image display unit 100. Since the string-pulling type toggle switch is attached in a downward direction of the housing (shade) 11, downsizing of the video-image-projecting-function-equipping lighting device is achieved, and the string part 90 and the tip part 91 of the string-pulling type toggle switch can be disposed within the diffusion range of the illumination light of the illumination light source 20.

At this time, as shown in FIG. 2, when a plurality of semiconductor light emitting elements are used as a light source of illumination light of the illumination light source 20, the string part 90 and the tip part 91 of the string-pulling type toggle switch are subjected to light illumination from a plurality of directions, and shades caused by the string part 90 and the tip part 91 of the string-pulling type toggle switch with respect to a light source of the illumination light emitted from the illumination light source 20 fade by a plurality of light rays having different illumination angles and become inconspicuous, so that a problem on a grade is difficult to cause. In contrast, the light rays of the projection video image from the optical unit 30 are respectively emitted from the emission opening of the optical unit 30. Therefore, when the string part 90 and the tip part 91 of the string-pulling type toggle switch are located within the irradiation region of the projection video images from the optical unit 30, video images corresponding to shade portions caused by the string part 90 and the tip part 91 of the string-pulling type toggle switch with respect to the projection video images are lacked, and the grade becomes serious deterioration.

Therefore, when the string-pulling type toggle switch is attached to the video-image-projecting-function-equipping lighting device, as shown in the respective drawings, it is desirable to make layout so that the tip part 91 is located within the diffusion range of the illumination light of the illumination light source 20 and outside the irradiation region of the projection video image from the optical unit 30 of the projection type video image display unit 100.

<Inner Configuration of Lighting Device with Video Image Projecting Function>

Figure 3:
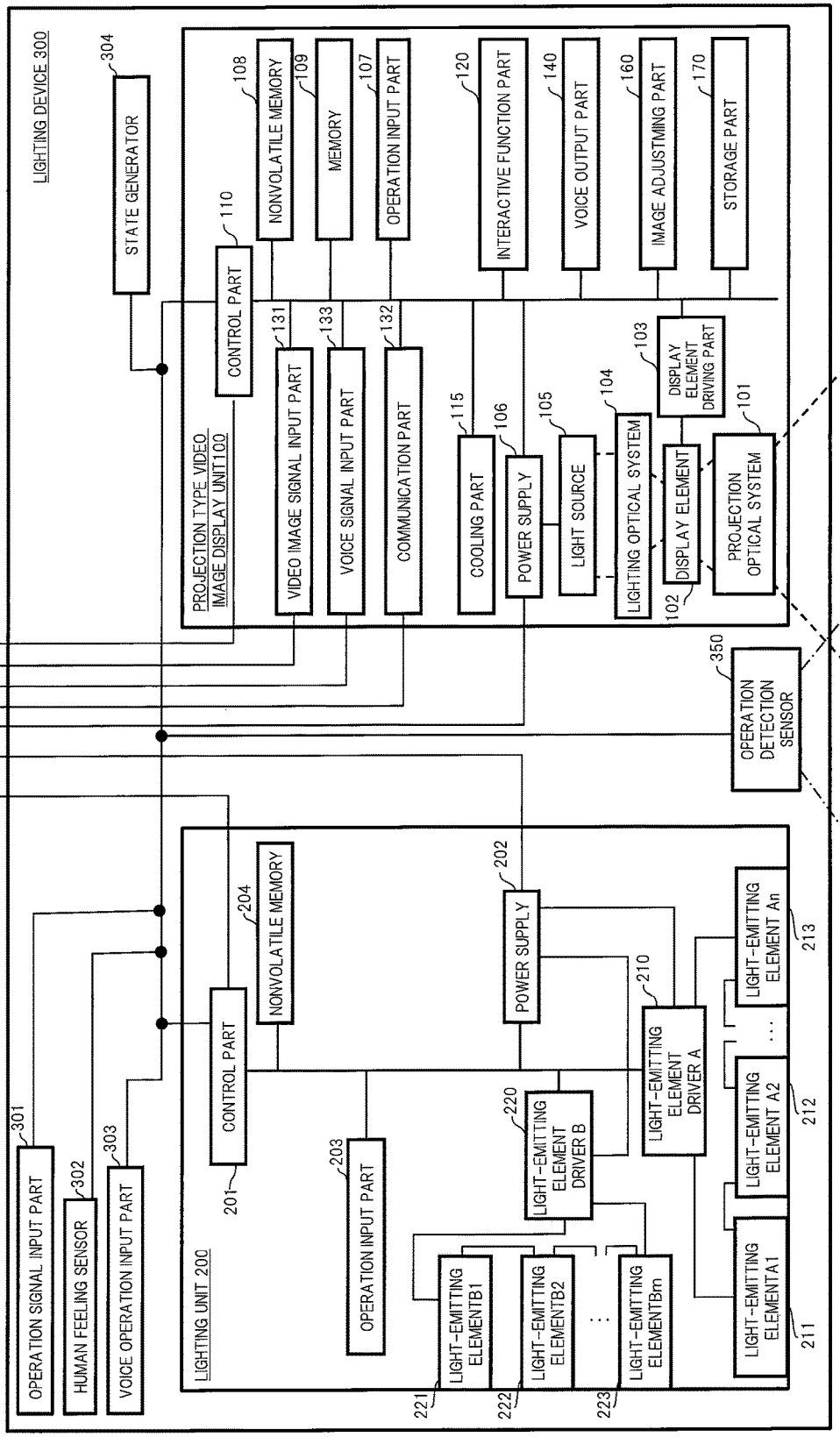
FIG. 3 is a block diagram showing one example of an inner configuration of the lighting device according to the embodiment of the present invention.

FIG. 3 is a block diagram showing one example of an inner configuration of a video-image-projecting-function-equipping lighting device 300. In the video-image-projecting-function-equipping lighting device 300, a projection type video image display unit 100 having a video image projecting function and a lighting unit 200 having an illumination light emitting function are included.

An operation signal input part 301, which serves as an operation button and a light receiving part of a remote controller, inputs an operation signal(s) from a user. A human feeling sensor 302 is a sensor for using infrared rays, ultrasonic waves, visible light or the like to discriminate presence or absence of a human(s) on a periphery of the lighting device 300 with video image projecting function or inside a room in which the video-image-projecting-function-equipping lighting device 300 is installed. The human feeling sensor 302 itself may use a human feeling sensor based upon a known technique as long as not otherwise specified in the following explanation. A voice operation input part 303 carries out a voice recognition processing by collecting voice on the periphery of the video-image-projecting-function-equipping-equipping lighting device 300, and converts a result(s) of the voice recognition processing to an operation signal(s). The operation signal generated in the voice operation input part 303 is used for operations of respective parts of the video-image-projecting-function-equipping-equipping lighting device 300.

An operation detection sensor 350 includes a camera for photographing range including a video image projection area on a display surface 61, and can detect reflected light due to an operation object by detecting non-visible light such as infrared ray components or the like. Incidentally, by setting a cutoff wavelength of an optical filter of an operation detection sensor 350 to a visible light wavelength range (for example, setting it to the way to a red visible light range), one portion of visible light components other than infrared rays (that is, a projection video image(s) on the display screen) can be photographed together with infrared ray components. An input from the operation detection sensor 350 is used for a discrimination processing of a gesture operation(s) of a user's hand in the vicinity of the video image projection area or the like.

A state generator 304 outputs or displays the following states: (1) a lighting state such as an ON/OFF state of illumination light of the lighting unit 200; (2) a stand-by state in which the illumination light of the lighting unit 200 is not lighted, but the lighting unit 200 itself is operated; (3) an erroneous state of the lighting unit 200; (4) a lighting state such as an ON/OFF state of the light source of the projection type video image display unit 100; (5) a stand-by state in which the light source of the projection type video image display unit 100 is not lighted, but the projection type video image display unit 100 itself is operated; (6) an erroneous state of the projection type video image display unit 100; (7) an operating state (in operation or not) of the human feeling sensor 302; (8) an operating state (in operation or not) of the voice operation input part 303; and (9) an operating state (in operation or not) of the operation detection sensor 350.

The state generator 304 may be constituted so as to indicate these plural kinds of states by changing colors, light emitting frequencies or the like of a plurality of LED indicators. Moreover, the state generator 304 may be constituted so as to indicate these plural kinds of states by using displays such as characters and marks through a liquid display monitor, an organic EL monitor, a monitor of another system, or the like.

The above-explained operation signal input part 301, human feeling sensor 302, voice operation input part 303, operation detection sensor 350, and state generator 304, etc. may be constituted so as to transmit/receive information to or from the control part of the projection type video image display unit 100 and the control part of the lighting unit 200. Thus, the inputs of the operation signal input part 301, the human feeling sensor 302, the voice operation input part 303, and the operation detection sensor 350, etc. can be used for respective processings in both of the projection type video image display unit 100 and the lighting unit 200. Moreover, the state generator 304 can collectively indicate states of both of the projection type video image display unit 100 and the lighting unit 200 by using the same LED indicator or monitor.

Next, explanation will be given on a configuration of the projection type video image display unit 100. A projection optical system 101 is an optical system for projecting a video image(s) onto a display surface 61, and includes a lens and/or a mirror. A display element 102 is an element for generating a video image(s) by modulating transmitted light or reflected light, and is formed by using, for example, a transmission-type liquid crystal panel, a reflection-type liquid crystal panel, a DMD (Digital Micromirror Device: Registered Trademark) panel, or the like. A display element driving part 103 transmits, to the display element 102, a driving signal corresponding to a video image signal.

A light source 105 generates light for video image projection, and is constituted by a high pressure mercury lamp, a xenon lamp, an LED light source, a laser light source, or the like. A power supply 106 converts, to a DC current, an AC current inputted from outside, and supplies power to the light source 105. Moreover, the power supply 106 supplies a required DC current to each of the other parts.

A lighting optical system 104 collects rays of light generated in the light source 105, makes the collected rays of light more uniform, and emits them to the display element 102. A cooling part 115 cools, if necessary, respective parts, which are made high in temperatures, such as the light source 105, the power supply 106, and the display element 102 by an air cooling system and/or a liquid cooling system. An operation signal input part 107 serves as an operation button or a light-receiving part of a remote controller, and inputs an operation signal from a user. The operation signal input part 107 may receive an infrared ray signal and/or a radio signal from the operation panel 70 shown in FIG. 1. When a signal from an operation signal input part 301 of a lighting device 300 is inputted to the projection type video image display unit 100, a structure without the operation signal input part 107 may be used.

A video image signal input part 131 is connected to an external video image output device, and inputs video image data. A voice signal input part 133 is connected to an external voice output device, and inputs voice data. A voice output part 140 can carry out a voice output based upon the voice data inputted to the voice signal input part 133. Moreover, the voice output part 140 may output an operation sound and an error warning sound installed therein. A communication part 132 is connected to, for example, an external information processing device, and inputs/outputs various control signals. The communication part 132 may carry out cable communication or wireless communication with the operation panel 70 of FIG. 1.

A nonvolatile memory 108 stores various pieces of data used in a projector function. Data to be stored in the nonvolatile memory 108 includes data for various operations in an interactive function as described later, display icons, and calibration data as described later, etc. A memory 109 stores video image data to be projected, and/or controlling data for devices. A control part 110 controls operations of respective parts to be connected thereto. Moreover, the control part 110 may input/output information to and from the operation signal input part 301, the human feeling sensor 302, the voice operation input part 303, and the operation detection sensor 350, etc., and may control these parts.

An interactive function part 120 is a part for carrying out an interactive operation such as a writing operation of characters and figures into a video image region by a user's operation(s) of a light-emitting pen and/or a finger(s). For this reason, the interactive function has: a function of calculating a position (position having been operated by the user) of the light-emitting pen or the finger by analyzing an infrared ray image(s) acquired from the operation detection sensor 350; and/or a function for executing applications, which are operable by the light-emitting pen and the finger, such as applications for composing operation icons in the video image projected and for carrying out a drawing processing or the like based upon the user's operations, and an application for carrying out an operation on the video image or the like inputted from an external video image output device.

In this case, a photographing range of the operation detection sensor 350 and an area of the video image (optical image on the display surface 61 in the video image area of the display element 102) projected onto the display surface 61 are hardly coincident with each other. For this reason, when a position operated (drawn) by the user is calculated, coordinates in the photographing range of the operation detection sensor 350 needs to be converted into coordinate positions in the video image projected onto the display surface 61. Therefore, the interactive function part 120 has functions etc. of carrying out a processing for the conversion and a processing for creating conversion table data (calibration data) for the conversion processing.

An image adjusting part 160 carries out an image processing to the video image data inputted by the video image signal input part 131. The image processing includes, for example, a scaling processing for carrying out enlargement, reduction, transformation, or/and the like on the image; a bright adjusting processing for altering brightness; a contrast adjusting processing for altering a contrast curve of the image; a retinex processing for dividing an image into light components to alter weighting for each of the components; and the like.

A storage part 170 records video images, images, voices, various pieces of data, and the like. For example, video images, images, voices, various pieces of data and the like may be preliminarily recorded therein at a time of shipment of products, or video images, images, voices, various pieces of data, and the like acquired from an external apparatus, an external server or the like through the communication part 132 may be recorded therein. The video images, images, various pieces of data and the like recorded in the storage part 170 have only to be outputted as projected video images through the display element 102 and the projection optical system 101. The voices recorded in the storage part 170 have only to be outputted as voices from a voice output part 140.

As explained above, various functions can be installed in the projection type video image display unit 100. However, the projection type video image display unit 100 does not necessarily have all of the above-mentioned configurations. Any configuration may be used as long as it includes a function of projecting a video image(s).

Next, explanation will be given on details of a configuration of the lighting unit 200 hereinafter.

A control part 201 controls respective parts connected thereto. Moreover, the control part 201 inputs/outputs information with the operation signal input part 301, the human feeling sensor 302, the voice operation input part 303, the operation detection sensor 350 and the like, and may control these parts. The operation signal input part 203 serves as an operation button and/or a light-receiving part of a remote controller, and inputs an operation signal from a user. The operation signal input part 203 may receive an infrared ray signal and a radio signal from the operation panel 70 of FIG. 1. When a signal from the operation signal input part 301 of the lighting device 300 is inputted to the lighting unit 200, a structure without the operation signal input part 203 may be used. A nonvolatile memory 204 stores various pieces of data to be used in the lighting unit 200.

The power supply 202 converts, into a DC current, an AC current inputted from outside, and supplies power to light-emitting element drivers (210, 220, etc.). Moreover, the power supply 202 supplies necessary respective DC currents to the other parts. The light-emitting drivers (210, 220, etc.) use power supplied from the power supply 202, and cause the light-emitting elements (211, 212, 213, 221, 222, 223, etc.) to emit light based upon control of the control part 201. The light-emitting elements become light sources for illumination light emitted by the lighting unit 200.

For example, in an example of FIG. 3, a light-emitting element driver A 210 collectively drives n light-emitting elements A1, A2, . . . , An (211, 212, 213, etc.) connected in series. The light-emitting element driver A 210 alters the luminance, and colors, etc. of those light-emitting elements based upon the control of the control part 201. In the same manner, a light-emitting element driver B 220 collectively drives m light-emitting elements B1, B2, . . . , Bm (221, 222, 223, etc.) connected in series. The light-emitting element driver B 220 alters the luminance, and colors, etc. of those light-emitting elements based upon the control of the control part 201. Those configurations make it possible to control changes of luminance and colors of a plurality of light-emitting elements for each of the light-emitting element drivers. In the example of FIG. 3, two sets of light-emitting element drivers and plural light-emitting elements are exemplified, but the number of sets described above may be one or be three or more. The number may be increased or reduced if necessary.

By the above-explained configuration, the lighting unit 200 can emit illumination light whose luminance and/or color are variably changed.

<Inclination of Projector Output Surface and Adjustment of Projection Screen>

Successively, a problem in the video-image-projecting-function-equipping lighting device 10 as described above, i.e., a problem arising when the projection type video image display unit 100 (see FIG. 1 described above) executes a function of displaying information onto, for example, an upper face (display surface) 61 of a desk will be explained below with reference to FIG. 4.

Figure 4:
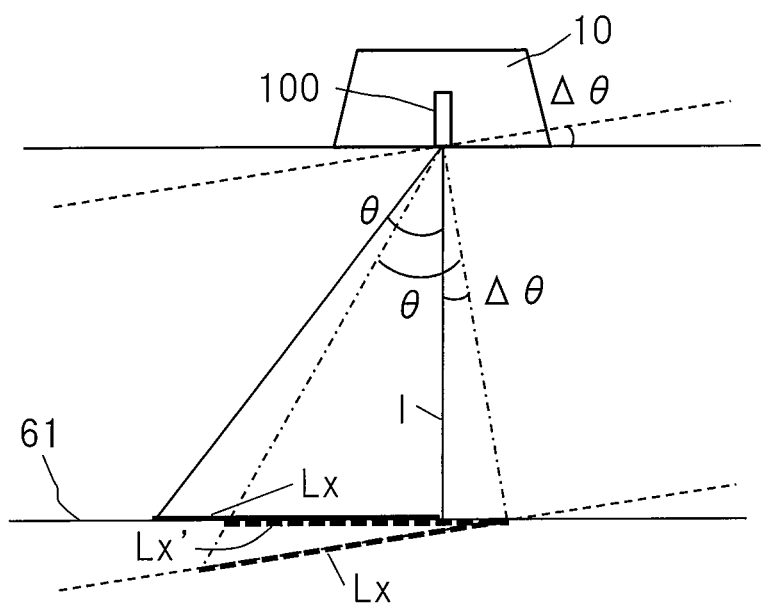
FIG. 4 is a view explaining a problem (s) in a case of executing a function(s) of the lighting device according to the embodiment of the present invention, particularly, a projection type video image display unit.

As shown in FIG. 4, when the video-image-projecting-function-equipping lighting device 10 is attached in parallel to the display surface 61, for example, the x-coordinate (see Lx in FIG. 1) is displayed so as to satisfy the following relationship, and no problem arises.

$Lx = l \tan \theta$

However, as indicated by broken lines in the drawing, when the lighting device 10 is attached with an inclination angle A with respect to the display surface 61, Lx to be displayed on the display surface 61 is indicated as follows.

$L'x = l \tan(\theta - \Delta\theta) + l \tan \Delta\theta$ $L'x < Lx$

In other words, when the projection type video image display unit 100 is inclined forward on the x-coordinate, the projection surface (Lx) is contracted. Moreover, even when the above unit is inclined on the y-coordinate (refer to Ly in FIG. 1), the same phenomenon occurs, i.e., the projection surface is distorted on the display surface 61, which brings an undesirable state.

Figure 5:
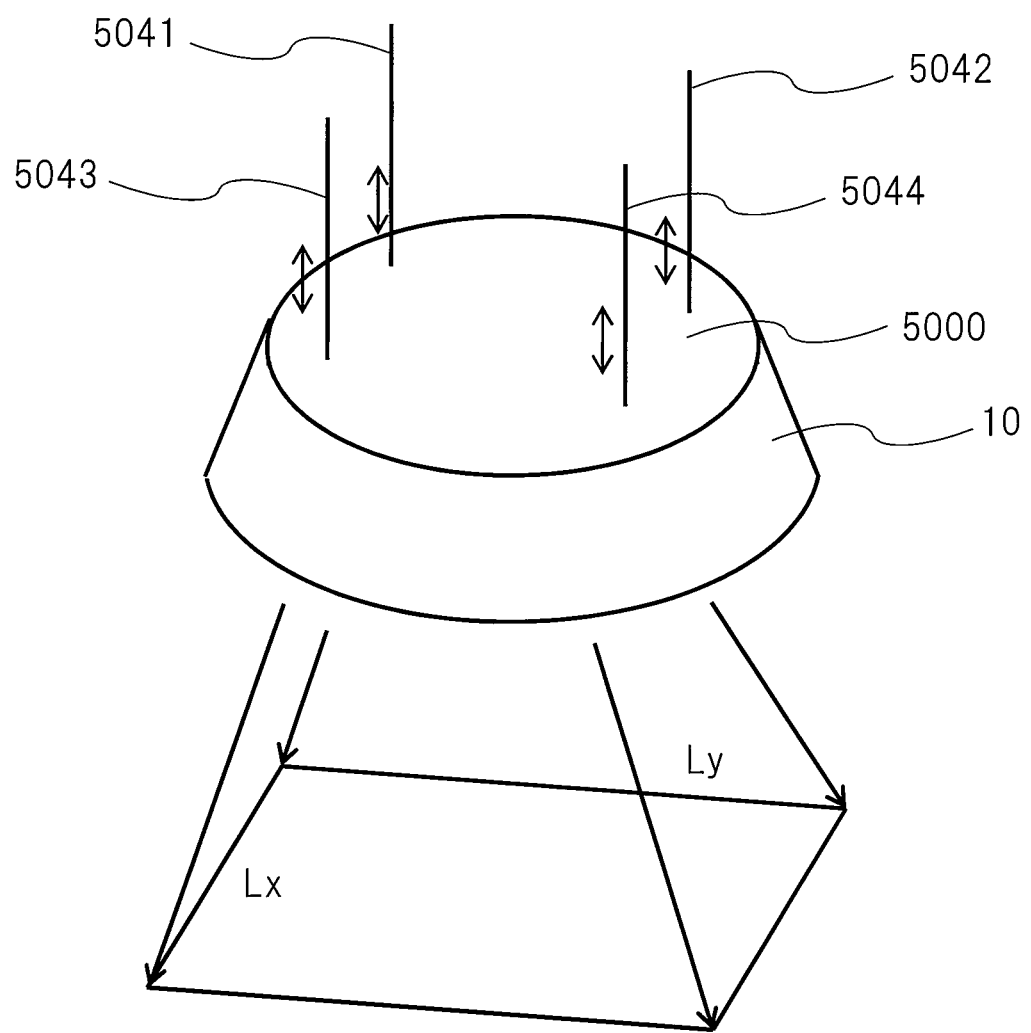
FIG. 5 is a view explaining a principle of a horizontality adjustment mechanism for solving the problem of the lighting device according to the embodiment of the present invention.

Therefore, to solve the above-mentioned problem, the present embodiment includes the lighting device 10 in which a horizontality adjustment mechanism capable of adjusting horizontality is incorporated, and its principle will be explained below with reference to the drawing. Incidentally, in the following explanation, as shown in FIG. 5 for convenience of the explanation, string-like, high-rigid wires such as piano wires are respectively attached to four positions on a top plate 5000 of the lighting device 10, these four wires 5041 to 5044 are fixed to a ceiling, and lengths thereof become adjustable although described later in detail.

<Manual Adjustment>

FIG. 6(A) and FIG. 6(B) show adjusting mechanisms (their specific structures will be explained later) including these four wires 5041 to 5044, the adjusting mechanisms being viewed respectively from a side face and an upper face of the lighting device 10. In FIG. 6(B), particularly, the four wires 5041 to 5044 are attached to regions divided into 4 portions separated by the x-coordinate and the y-coordinate passing a center of the top plate 5000. Moreover, in this case, the adjusting mechanisms of the respective wires are indicated as knobs (buttons) adjA, adjB, adjC and adjD, for convenience of explanation. Incidentally, the knobs (buttons) adjA, adjB, adjC and adjD serving as the adjusting mechanisms are set so as to make their lengths shorter when turned rightward (clockwise) and to make their lengths longer when turned leftward (counterclockwise). By this arrangement, as shown by arrows in FIG. 5 describe above, such settings make it possible to make the lengths of the respective wires adjustable in a vertical direction and to make the top plate 5000 adjustable horizontally and, therefore, the projection type video image display unit 100 of the lighting device 10 can be made a horizontal state (normal state).

In FIG. 7, explanation will be given on, particularly, an example of adjusting an inclination in the x-coordinate direction. In this case, however, the above example is set so that an inclination in the y-coordinate direction is not given (or the inclination has been adjusted).

FIG. 7(A) shows a projection image before adjustment, that is, a projection image from the projection type video image display unit 100 of the lighting device 10 having an inclination in the x-coordinate direction. As clearly indicated by this drawing, positions of apexes of a lower side deviate from original positions and are shifted to an apex D' and an apex C', which brings trapezoid-shaped distortion in a state in which a side C'D' becomes shorter than a side AB. That is, the wires 5043 and 5044 become longer. Thus, by rotating the knob (button) adjD clockwise, the length of the wire 5043 can be shortened. As shown in FIG. 7(B), when the shape is corrected and the apex A in the drawing reaches approximately 90 degrees, the adjustment is stopped. Successively, by rotating the knob (button) adjC clockwise, the length of the wire 5044 can be made shorter. As shown in FIG. 7(C), when the shape is corrected in the same manner and the apex B in the drawing reaches approximately 90 degrees, the adjustment is stopped. As a result, as shown in FIG. 7(D), the inclination of the projection type video image display unit 100 is corrected, and a projection image having a rectangular shape (including a square) can be obtained.

The same is true for the adjustments in the inclination in the y-coordinate direction, and FIG. 8(A) to FIG. 8(D) show a process of the adjustments. That is, an inclination in the y-coordinate direction of the projection type video image display unit 100 is corrected, and a projection image having a rectangular shape (including a square) can be obtained.

Moreover, FIG. 9 and FIG. 10 show a horizontality adjustment mechanism in which the lighting device 10 is suspended from the ceiling by using three wires in place of the above-mentioned four wires, and show its adjusting process. In this case, as shown also in FIG. 9(A) and FIG. 9(B), one wire 5021 out of the three wires is fixed onto the x-coordinate (or the y-coordinate) passing the center of the top plate 5000, and the remaining two wires 5022 and 5023 are made parallel to the y-coordinate, and fixed opposite a fixed position of the wire 5021. Furthermore, in this case, the length of the wire 5021 is fixed, and the lengths of the remaining two wires 5022 and 5023 are made variable (length-adjustable), and the aforementioned knobs (buttons) adjE and adjF are attached to the remaining two wires 5022 and 5023, so that the adjustment mechanism is formed.

FIG. 10(A) shows a distorted projection image from the projection type video image display unit 100 before adjustments. As shown in FIG. 10(B), by rotating the knob (button) adjE clockwise, an apex E' is returned to an original position E. When the apex A reaches approximately 90 degrees, the adjustment is stopped. Next, by rotating the knob (button) adjF clockwise, an apex F' is returned to an original position F. When all the apexes A to F reach approximately 90 degrees, the adjustments are stopped. As a result, as shown in FIG. 10(D), the inclination of the projection type video image display unit 100 is corrected, so that a projection image having a rectangular shape (including a square) can be obtained.

Incidentally, at a time of the above-mentioned adjustment, the projection type video image display unit 100 of the lighting device 10 is made an ON state, and a projection image having a rectangular shape (including a square) is formed on the display surface 61. At this time, however, when utilization of the above-mentioned projection type video image display unit 100 simultaneously brings displays as shown in FIG. 11 and FIG. 12, which makes it easy to perform adjustment work of the inclination of the above-mentioned lighting device 10.

That is, FIG. 11(A) shows one example of a display screen used in being adjusted by a horizontality adjustment mechanism in which the lighting device 10 is suspended by four wires. In this case, apexes A, B, C and D of the projection image are displayed at four corners of an image projected onto the display surface 61 from the projection type video image display unit 100 so as to correspond to the knobs (buttons) adjA, adjB, adjC and adjD serving as the adjustment mechanisms of the above-mentioned wires attached to the top plate 5000. By simultaneously executing these displays at the time of the adjustments, a worker(s) can easily confirm positions (apexes) of the projection image changed by rotating the knobs (buttons), so that the adjusting work can be easily carried out.

Incidentally, at this time, if not only the positions of the apexes corresponding to the knobs (buttons) but also rotating directions of the knobs (buttons) and moving directions of the apexes with accompanying the rotating directions are displayed by arrows or the like as shown in FIG. 12, the worker can grasp more intuitively the necessary rotating directions of the knobs (buttons), so that an installation of an apparatus or equipment becomes more convenient. Incidentally, in an example shown in the drawing, one example of a display corresponding to the apex D particularly shown in FIG. 11(A) is given. In this case, the rotating directions of the knob (button) are indicated by round arrows, and the moving directions of the apex D with accompanying the rotating directions are also indicated by void arrows.

Moreover, FIG. 11(B) shows one example of a display screen used in being adjusted by the horizontality adjustment mechanism in which the lighting device 10 is suspended by the three wires. Also by using this arrangement, such an effect is obtained in the same manner as described above that a correspondence relation between the knob (button) and the moving apex can be easily grasped. Moreover, also in this case, since the display as shown in FIG. 12 is simultaneously performed, the worker can obtain desirable working guide information about more desirable adjusting work.

Figure 13:
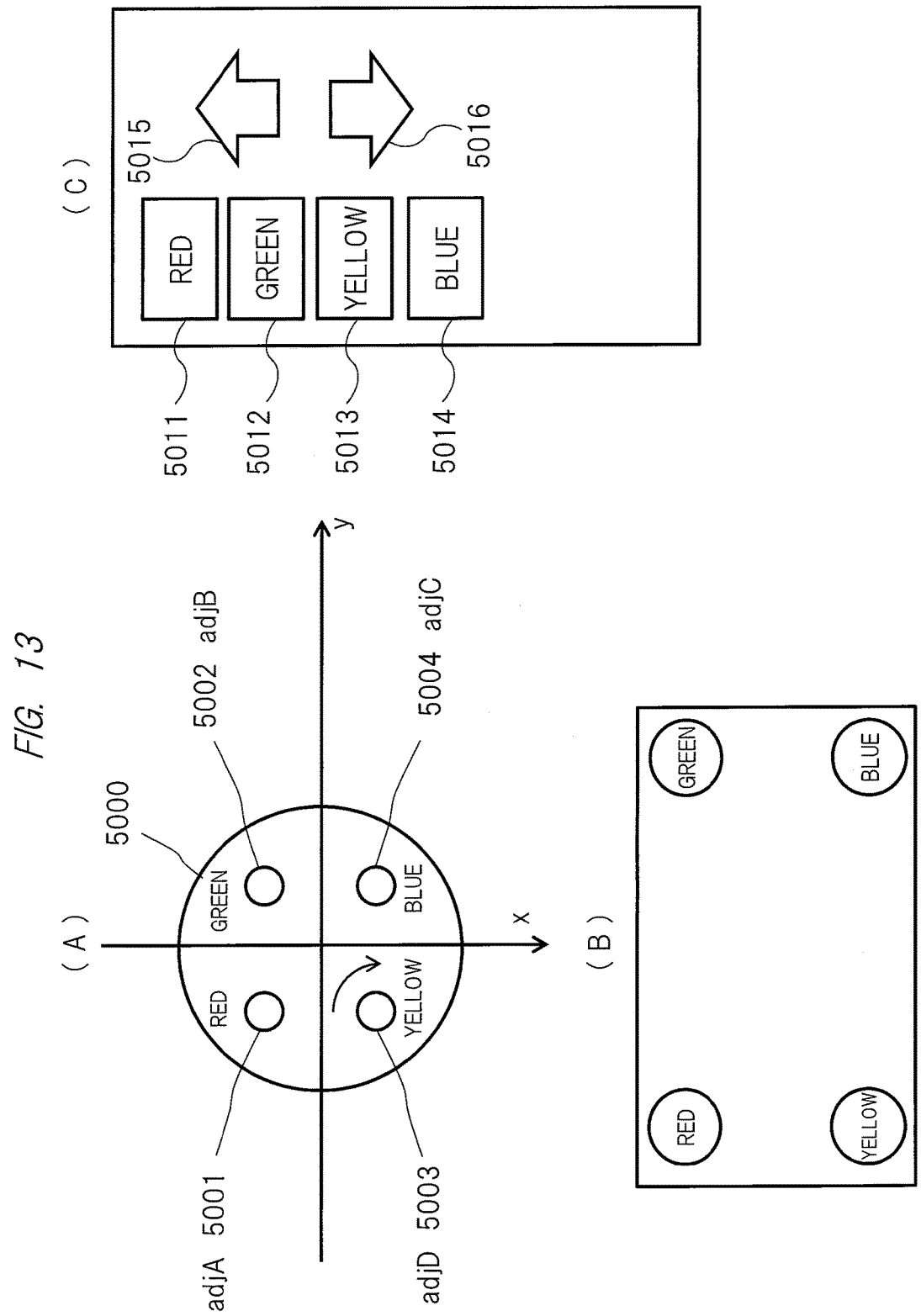

Moreover, FIG. 13 shows one example of a display screen applicable to a case of: using a not-shown motor or the like to rotate the above-mentioned knobs (buttons); and automatizing the adjustment of the horizontality adjustment mechanism. In FIG. 13(A), a rotation driving part or the like of a motor or the like not shown in this case is coupled to each of the knobs (buttons) adjA, adjB, adjC and adjD and, moreover, four colors of red, green, blue and yellow, are preliminarily assigned thereto. Additionally, as shown in FIG. 13(B), when the adjustments by the horizontality adjustment mechanism are made, the four colors of red, green, blue and yellow corresponding to the above-mentioned knobs (buttons) adjA, adjB, adjC and adjD are displayed near the respective apexes of the projection image. On the other hand, for example, an operation panel 70 attached to a remote controller, a wall or the like is provided with, as shown in FIG. 13(C), selection buttons 5011 to 5014 corresponding to the above-mentioned four colors of red, green, blue and yellow and vertical arrows 5015 and 5016 indicating a direction of the adjustment of the lighting device 10.

Therefore, the worker for carrying out the adjustments determines which of the apexes should be moved while observing the projection image shown in FIG. 13(B), the determination being made by selecting selection buttons 5011 to 5014 indicated by the corresponding colors on the operation panel 70 shown in FIG. 13(C). Thereafter, any one of the above-mentioned vertical arrows 5015 and 5016 is pushed in accordance with a direction to be moved. Thus, the adjustments by the above-mentioned horizontality adjustment mechanism can be made by easy work for pushing only the button on the operation panel 70. Incidentally, the above-mentioned example has been explained by using the operation panel 70 having the operation buttons as shown in FIG. 13(C). However, the present invention is not limited thereto. It will appear to those skilled in the art that the present invention can be realized also by displaying, as a part of the image projected by the projection type video image display unit 100, the operation panel having the operation buttons as shown in FIG. 13(C).

Incidentally, in the above-mentioned embodiment, the horizontality adjustment mechanism in which the lighting device 10 is suspended by the three or four wires has been explained in detail. In addition to this, necessity of adjusting a rotational position of the lighting device 10 is also considered. Although not illustrated in the drawing in this case, however, the adjustment of the lighting device 10 including its rotational position by attaching etc. a rotatable mechanism or the like to the above-mentioned top plate 5000 can be made.

<Adjustment Utilizing Interactive Functions>

Moreover, an adjustment utilizing an interactive function of the horizontality adjustment mechanism of the above-mentioned lighting device 10 will be explained, particularly, as an example of mounting a camera thereon with reference to FIG. 14. Incidentally, FIG. 14 includes a constituent element(s) required for utilizing the interactive function among the constituent elements of the lighting device 100 shown in FIG. 3 described above, and shows a configuration by extracting or adding the required constituent element from or to the drawing.

Incidentally, as shown in FIG. 14, the configuration required for this purpose includes: a removable recording medium 1701A; a removable recording medium slot 1701B into which the removal recording medium 1701A is inserted; a removable recording medium control part (removable recording medium IF) 1702; a microcomputer 1703 (corresponding to the control part 110 of FIG. 3); a memory 1704 (corresponding to the memory 109 and the nonvolatile memory 108 of FIG. 3); a lighting part 1708 (corresponding to the lighting unit 200 of FIG. 3); an LED driver 1709 (corresponding to the light-emitting element drivers A 210 and B 220 of FIG. 3); an LED illumination 1710 (corresponding to light-emitting elements A1 211 to Bm 223 of FIG. 3); a projector part 1711 (corresponding to the projection type video image display unit 100 of FIG. 3); a panel driver 1712 (corresponding to the display element driving part 103 of FIG. 3); a panel 1713 (corresponding to the display element 102 of FIG. 3); a projection optical system 1714 (corresponding to the projection optical system 101 of FIG. 3); a lighting optical system 1715 (corresponding to the lighting optical system 104 of FIG. 3); a light source 1716 (corresponding to the light source 105 of FIG. 3); and a light source driving part 1717 (corresponding to the display element driving part 103 of FIG. 3).

Figure 18:
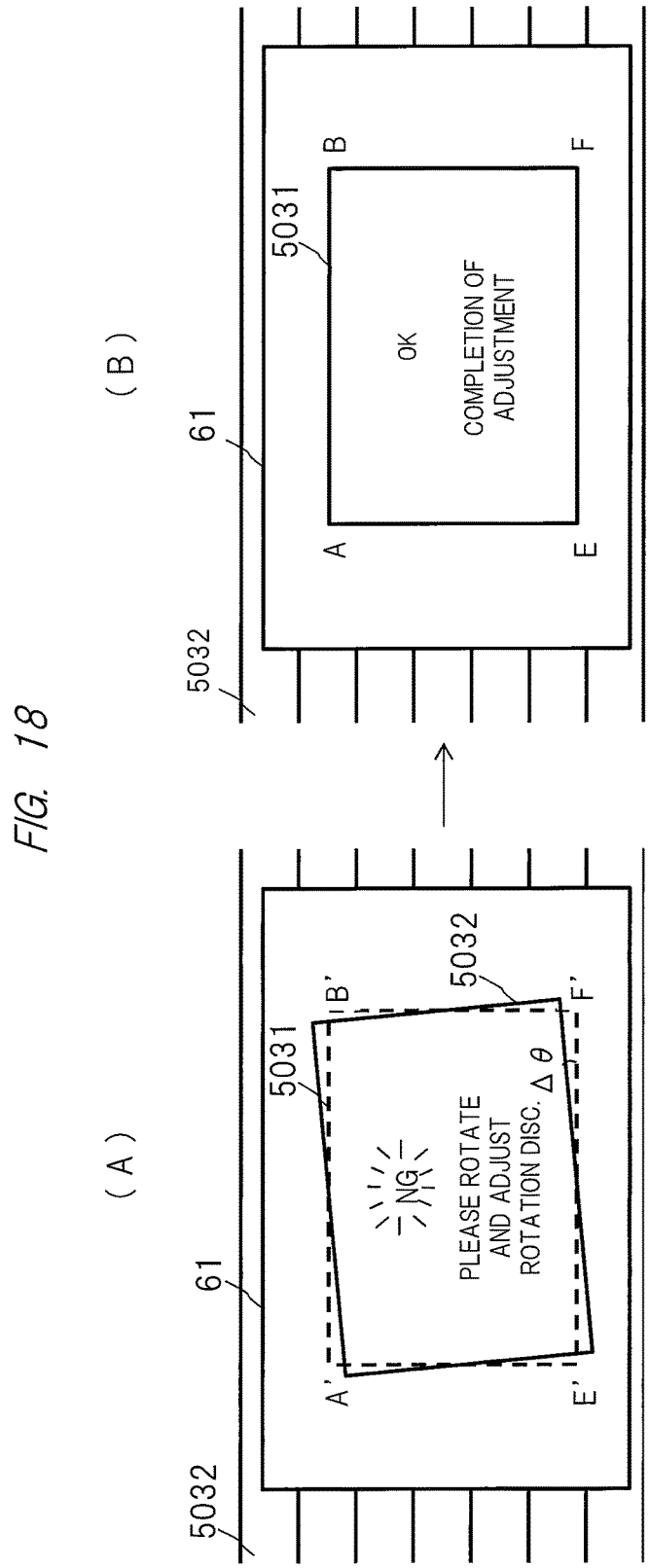

In accordance with this configuration, an operator forms contents (shown below) to be displayed as a message by using, for example, a personal computer (PC) 1720A, a smart phone or a tablet terminal 1720B of his or her own (operation on a PC, smart phone or tablet terminal side), and thereafter copies the thus-formed contents on the above-mentioned removable recording medium 1701A. By doing so, for example, display information as shown in FIG. 16 and FIG. 18 described below can be preliminarily edited, and can be displayed on the display surface 61 in a state in which the projection type video image display unit 100 of the lighting device 10 is turned ON.

Moreover, FIG. FIG. 14 further shows a configuration for realizing the interactive function, and the configuration required for this purpose includes an operation detection sensor 2201 for detecting a touch operation and a gesture operation of the user. Incidentally, as shown also in FIG. 15, the operation detection sensor 2201 includes a camera attached to one portion (more specifically, one portion of the diffusion plate 12 forming its bottom portion) of the lighting device 10, and so a video image(s) viewed from above the display surface 61 can be fetched. Moreover, the touch operation detected by the operation detection sensor 2201 is inputted to the microcomputer 1703.

Moreover, the above configuration also includes a voice processing part 2405 to which an output of the microcomputer 1703 is inputted, and a speaker 2406 which converts, into voice, a voice signal from the voice processing part 2405 and outputs the voice. Additionally, as clearly shown also in FIG. 14, in the present embodiment, a keystone adjustment signal is outputted from the microcomputer 1703 to the panel driver 1712 of the projector part 1711, and a color temperature adjustment signal, an ON/OFF signal and a brightness adjustment signal are outputted also to the LED driver 1709 of the lighting part 1708.

Successively, an adjustment process of the horizontality adjustment mechanism of the lighting device 10 that utilizes the above-mentioned interactive function will be detailed below with reference to FIG. 16.

First, a screen projected onto the display surface 61 is detected by the camera forming the above-mentioned operation detection sensor 2201, and presence or absence of distortion on an outer frame of the screen is determined by an image processing or the like like using the microcomputer 1703 or the like. As a result, when any distortion on the outer frame of the screen is detected, as shown also in FIG. 16(A), a display indicating the detection, that is, a display of "NG" in the present example while blinking is shown on the projection screen, and simultaneously an operation instruction such as "Please turn the adjD button clockwise" is projected thereto. The operator carries out an adjustment in accordance with this instruction (however, in this case, supposing that the "yellow" button 5013 and the downward void arrow shown in FIG. 13(C) are pushed). As a result, when a left side of the drawing comes to an approximately correct position, as shown also in FIG. 16(B), a display of "OK" while blinking is shown. Thereafter, when there is still another side to be adjusted (in the present example, a right side and a lower side), the display of "NG" while blinking is again shown and, simultaneously, a button necessary for the adjustment is determined (in this case, the adjC button). Additionally thereto, as shown also in FIG. 16(C), an operation instruction such as "Please turn the adjC button clockwise" is projected thereto. In accordance with this instruction, the operator carries out the adjustment (in an example of FIG. 13, the "blue" button 5014 and the downward void arrow 5016 are pushed).

As a result of the adjustments carried out by the operator in accordance with the above-mentioned instructions, when it is determined that the distortion on the outer frame of the image projected onto the display surface 61 has disappeared (that is, has returned to approximately its original rectangular shape), as shown also in FIG. 16(D), instructions "OK" together with "Completion of adjustments" or the like are projected, and the operator is informed of the completion of the adjustments.

Incidentally, as described above, the adjustment utilizing the interactive function has been explained based upon a case in which the lighting device 10 is suspended from the ceiling by the four wires. However, the present invention is not limited only to the above configuration. It will appear to those skilled in the art that the present invention can realize, simultaneously with the above, the adjustment utilizing the interaction function even when the lighting device 10 is suspended from the ceiling by the three wires as shown also in FIG. 9 described above.

Moreover, in the above description, given has been an example in which a shape (distortion) of an image is determined by an image processing due to the camera, and the instructions of the required adjustment work are displayed on the projection surface. However, by automatically carrying out the adjustment of the wire length by, for example, a mechanism utilizing a motor, the above-mentioned adjustment process can be automated.

Moreover, as shown in FIG. 17(A) and FIG. 17(B), if a rotation disc 5033 capable of adjusting a rotational position (rotation angle direction) with respect to the top plate is further attached onto the top plate 5000 of the lighting device 10 and the three or four wires extending from the ceiling are attached to the rotation disc 5033, it becomes possible to also adjust a rotational position of a projection image in addition to the horizontality adjustment (distortion adjustment of the projection image) of the above-mentioned lighting device. Incidentally, in this case, only the case in which the lighting device 10 is suspended from the ceiling by the three wires has been described. However, it is clearly understood that the same is true for a case where four wires are used. Moreover, the adjustments of the rotational positions of the top plate 5000 and the rotation disc 5033 of the lighting device 10 may be manually carried out or may be automatized by utilizing, for example, a motor or the like.

Subsequently, FIG. 18(A) and FIG. 18(B) show an example in which an adjustment of a rotational position of a projection image is carried out by the rotation mechanism using the above-mentioned rotation disc 5033. Incidentally, this example is an example of the adjustment utilizing the interactive function shown also in FIG. 16.

For example, when the horizontality adjustment (distortion adjustment of projection image) of the above-mentioned lighting device is completed and then parallelism of the projection image from the projection type video image display unit 100 of the lighting device 10 is adjusted to (coincides with) a table (display surface) 61 disposed in parallel with grain (horizontal direction in the drawing) of a floor plate 5032 in this example, "NG" while blinking is displayed and simultaneously an operation instruction such as "Please rotate and adjust the rotation disc" is projected, as shown also in FIG. 18(A). Moreover, at this time, if a deviation "Δθ" in angle between the projection image and the table (display surface) 61 is also displayed, such a deviation display is more convenient to the user.

When the rotation angle is adjusted by the operator in accordance with the above-mentioned instruction and the parallelism (disposition direction) of the projection image is consequently made approximately coincident with the table, as shown also in FIG. 18(B), "OK" while blinking is displayed and simultaneously a display of "completion of adjustment" is projected. Incidentally, also in this case, additionally to the adjustment utilizing the interactive function, the adjustment process can be automatized by a mechanism utilizing a motor or the like.

Moreover, in the above-mentioned horizontality adjustment mechanism utilizing the interactive function, explained has been an example in which a camera is adopted as a means for detecting a distortion in a projection image and a deviation in the rotation angle. However, a gravity sensor, for example, an MEMS acceleration sensor can be also utilized besides.

As shown in FIG. 19(A), this MEMS acceleration sensor outputs acceleration in three-axis directions of Ax, Ay and Az by an analog voltage, and an inclination of the sensor can be detected from the output voltage. As shown in FIG. 19(B), by mounting the acceleration sensor in the lighting device 10, the inclination of the lighting device 10 can be detected from output voltage components in the Ax and Ay directions.

Figure 20:
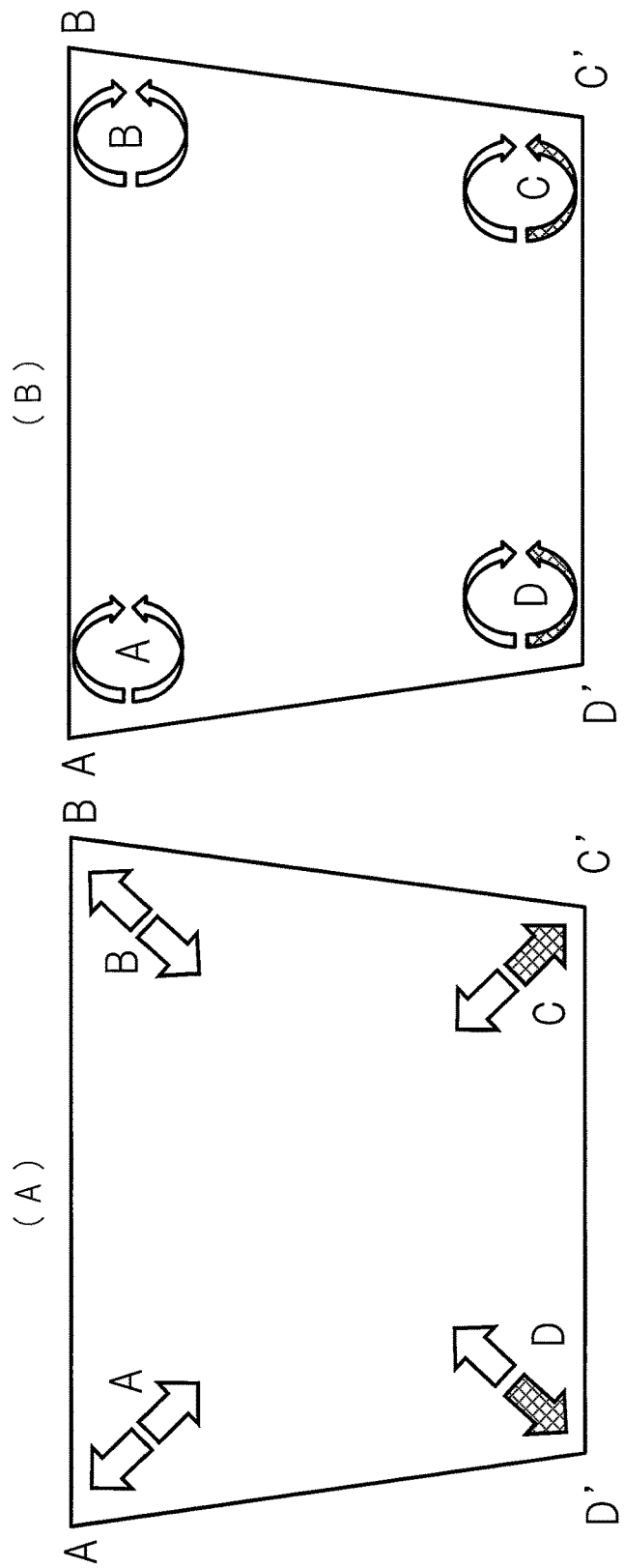
Figure 21:
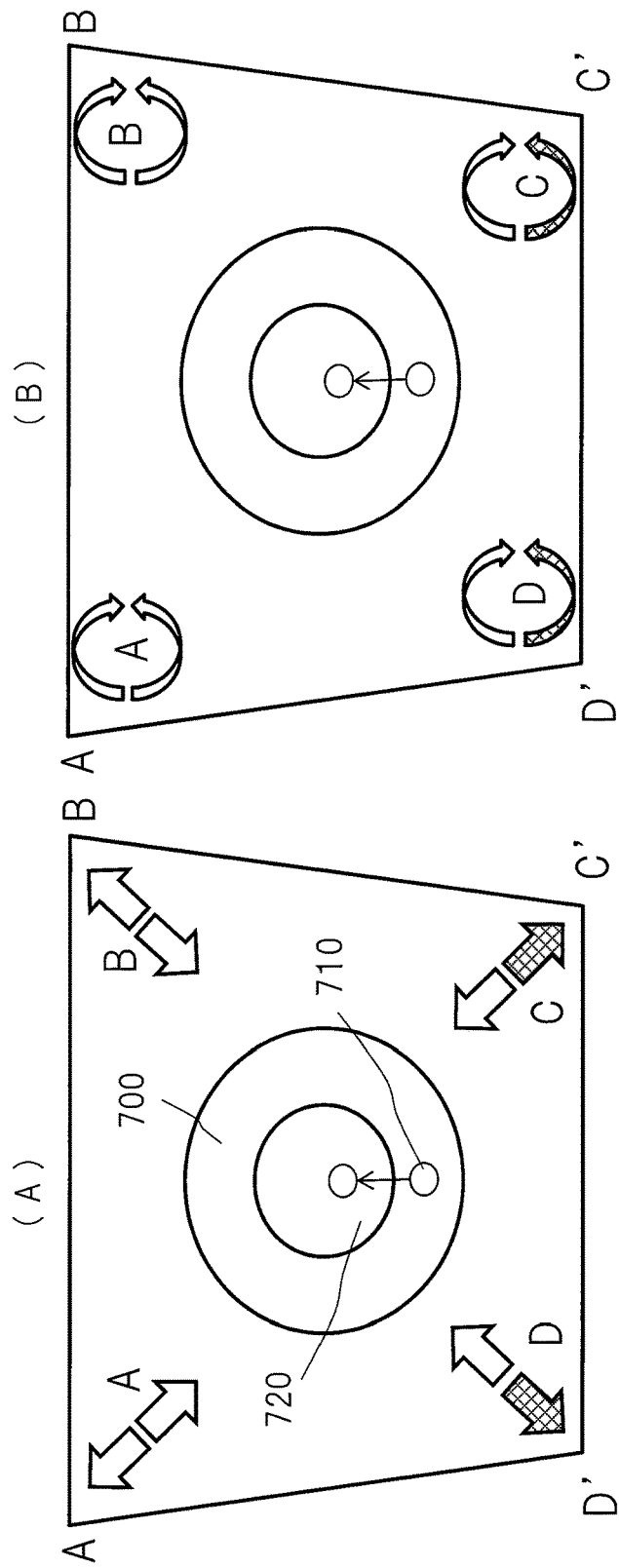

Incidentally, FIG. 20 and FIG. 21 show one example of a display in a case of adopting the above-mentioned gravity sensor as the horizontality adjustment mechanism utilizing the interactive function.

In an example shown in FIG. 20(A) and FIG. 20(B), in the approximately the same manner as in the above-mentioned FIG. 11 and FIG. 12, the inclination of the projection type video image display unit 100 including the lighting device 10 is detected by the gravity sensor to determine a portion(s) requiring to be adjusted, and an arrow (s) for indicating a position (s) of the portion is colored (for example, in yellow: however, mesh display in the drawing) and displayed (incidentally, an arrow(s) indicating a portion not requiring to be adjusted is colored in white). Then, when the adjustment is completed, the arrow is colored in white. In this example, arrows C' and D' at both ends on the lower side are colored (in yellow) and displayed.

Additionally, in an example shown in FIG. 21(A) and FIG. 21(B), an image of a so-called level 700 is further displayed in a center portion of a projection screen. That is, a small symbol "o" indicated substantially at the center portion of the drawing represents a bubble 710 inside the level. This bubble 710 moves toward the center portion of the level 700 as shown by an arrow in the drawing, as the projection type video image display unit 100 including the lighting device 10 is made in parallel. Incidentally, in this case, the adjustment is supposed to be completed when the bubble 710 enters an interior of an inner frame 720 that forms an adjustment reference.

<Attaching (Suspending) Structure of Lighting Device>

Explained below with reference to the accompanying drawing will be a structure for attaching (suspending), to (from) a ceiling, the lighting device 10 so as to be adjustable horizontally, the lighting device including its inner structure having been detailed above.

FIG. 22 shows one example of a so-called three-point stopping structure. Moreover, FIG. 23(A) and FIG. 23(B) respectively show a front view and a side view of the three-point stopping structure shown in FIG. 22. As clearly shown by these drawings, lower ends of the wires 5041 to

5043 are respectively fixed to three portions of a top plate 5000 (see the above-mentioned drawings) of the lighting device 10. On the other hand, other ends (upper ends) of these three wires are fixed onto an attaching member 5500 that is attached to an illumination commercial power supply (for example, an outlet for a lighting apparatus: not shown in the drawing) provided on a ceiling surface, an outline of the attaching member being formed formed into a bowl shape. Incidentally, reference numeral 5600 in the drawing represents a cable for supplying necessary power to the above-mentioned lighting device 10 or for transmitting a signal also including a necessary control signal. Moreover, reference numeral 5060 in the drawing represents a length adjusting member to be detailed below.

Further, FIG. 24 is a partially enlarged cross-sectional view that enlargedly shows one portion of a wire (for example, wire 5041) serving as a member constituting the above-mentioned structure. As clearly shown also by the drawing, the wire 5041 is divided into two wires 5041-1 and 5041-2, and screw grooves 5050-1 and 5050-2 are formed in respective tip portions thereof. Moreover, tip portions of these two wires 5041-1 and 5041-2 are inserted into a length adjusting member 5060 having a nut shape, and threadedly engaged with screw grooves 5061-1 and 5061-2 formed in its inner circumferential surfaces.

More specifically, the screw groove 5050-1 formed in the tip portion of the wire 5041-1 and the screw groove 5061-1 (left side in the drawing) of the adjusting member 5060, with which the tip portion is threadedly engaged, form, for example, right threads or a right screw. On the other hand, the screw groove 5050-2 formed in the tip portion of the wire 5041-2 and the screw groove 5061-2 (right side in the drawing) of the adjusting member 5060, with which the tip portion is threadedly engaged, form, for example, left threads or a left screw. In accordance with this configuration, as shown by arrows in the drawing, rotation of the above-mentioned adjusting member 5060 in a counter clockwise direction A causes the two wires 5041-1 and 5041-2 to move in mutually approaching directions A. In contrast, rotation of the member in a clockwise direction B causes the two wires 5041-1 and 5041-2 to move in mutually departing directions B. Thus, the entire length of the wire 5041 can be adjusted.

Incidentally, explained in the above-mentioned example has been the three-point stopping structure in which the three wires respectively extend downward from and are attached to the bowl-shaped attaching member 5500. However, in place of this structure, as shown in FIG. 25, FIG. 26(A), and FIG. 26(B), the above-mentioned three-point stopping structure can be realized by using two wires extending from the bowl-like attaching member 5500. Incidentally, in this case, for example, the two wires 5042 and 5043 are bundled from their upper portions so as to form one wire, and formed into a "Y"-letter shaped wire as a whole. Moreover, in this case, the above-mentioned adjusting member 5060 is not attached to the remaining one wire 5041. On the other hand, the adjusting member 5060 is attached to a portion bundled as one wire from the upper portions of the remaining two wires 5042 and 5043, and the adjusting member 5060 is attached to one of the two branched wires (wire 5043 in the present example). In the present example, since only the two wires are attached to the bowl-shaped attaching member 5500, this configuration is desirably applied, particularly, to a case in which the attaching member has a small size.

That is, also in accordance with this configuration, the three-point stopping structure of the lighting device 10 can be realized in the same manner as described above. Incidentally, in this configuration, the projection image for the three-point stopping structure shown in FIG. 9 and FIG. 11(B) mentioned above may be set so as to make the apex A correspond to the wire 5041 and make the other apexes E and F correspond to the other wires 5042 and 5043.

In this manner, since the above-mentioned three-point stopping structure is adopted as the structure for attaching (suspending) the lighting device 10 to (from) the ceiling, the number of wires and the number of adjusting members can be reduced to form a more economically inexpensive structure. However, the present invention is not limited thereto. If will appear to those skilled in the art that the present invention can adopt a four-point stopping structure by four wires in the same manner as the above. Incidentally, in this case, the lower ends of the four wires 5041 to 5044 including the length adjusting member 5060 shown in FIG. 24 are attached to the four positions on the top plate 5000 of the lighting device 10 as shown also in FIG. 5, and the upper ends thereof are fixed onto the attaching member 5500.

Moreover, as shown in FIG. 27, a four-point stopping structure of the lighting device 10 can be realized by utilizing two wires, each of the two wires being formed wholly into a "Y"-letter shape (see FIG. 25 described above) in which two wires are bundled from their upper portions so as to form one wire. Incidentally, by considering stability in suspending the lighting device including the above-mentioned three-point stopping structure, the gravity G of the lighting device is desirably set to exist inside a triangular or square region (indicated by a slanting line portion in FIG. 27) defined by the three points or four points where the wires are fixed onto the top plate 5000. In this case, particularly, the four-point stopping structure is more desirable because the above region is made larger.

In addition, as shown in FIG. 28(A) and FIG. 28(B), arms 5055 to 5057 holding three members 5051 to 5053 to which the lower ends of the three wires 5041 to 5043 are fixed, are held at predetermined positions by the rotation disc 5033. The rotation disc 5033 is provided with a rotation shaft at its center, and holds the top plate 5000 so as to be rotatable. A cam 5054 having a rotation shaft is provided on the top plate 5000, and its rotational position is regulated by stoppers 5058-1 and 5058-2 provided on the arm 5056. In FIG. 28(A), the cam 5054 abuts on the stopper 5058-1. When the cam 5054 is rotated in a direction of the stopper 5058-2, the top plate 5000 is also rotated. As shown in FIG. 28(B), when the cam 5054 abuts on the stopper 5058-2, the top plate 5000 is rotated by about 90 degrees. By rotating the cam 5054 around the rotation shaft, the rotation angle of the top plate 5000 can be finely adjusted, which makes it possible to obtain an optimal position relative to a projection surface. In the present embodiment, the stopper 5058-1 and the stopper 5058-2 have magnets therein, and the position of the top plate 5000 is determined by attracting the cam 5054 through a magnetic force.

Moreover, although not shown in the drawings, for example, attaching a winding part utilizing a motor or the like to an end of the wire instead of attaching the length adjusting member 5060 shown in FIG. 24 to one portion of the wire for suspending the lighting device can also automatize the above-mentioned manual length adjustment. Further, it will appear to those skilled in the art that the manual length adjustment can be automatized by utilizing, for example, a motor, a rack and opinion mechanism, or the like as a mechanism for adjusting a rotation angle between the top plate 5000 in the lighting device 10 described also in FIG. 17 or FIG. 28 and the rotation disc 5033.

As described above, described have been the video-image-projecting-function-equipping lighting devices to become various embodiments of the present invention. However, the present invention is not limited only to the embodiments described above and includes various modification examples. For examples, the above embodiments have been described about the entire system in detail to make the present invention easily understood, and the present invention is not always limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

EXPLANATION OF REFERENCE CHARACTERS

10 . . . Lighting device; 100 . . . projection type video image display unit; 200 . . . Lighting unit; 61 . . . Display surface; 5000 . . . Top plate; 5021 to 5024 . . . Wires; 5033 . . . Rotation disc; 5060 . . . Adjusting member; and 5500 . . . Attaching member.

The invention claimed is:

1. A lighting device comprising:
a housing;
a lighting unit disposed in the housing and including one or more light emitting elements configured to emit illumination light; and
a projection type video image display unit disposed in the housing and including a display element and a projection optical system configured to project an image;
three or more wires connected to the housing at three or more points and configured to suspend the housing from a ceiling; and
three or more length adjusting members respectively connected to the three or more wires, each of the length adjusting members configured to lengthen and shorten the respective one of the wires connected thereto,
wherein the three or more length adjusting members are configured to adjust horizontality of the housing, and
the projection type video image display unit includes a microcomputer programmed to control the display element to display the image including one or more icons indicating respective adjustment directions of one or more of the length adjusting members to guide adjustment of the horizontality of the housing with respect to a projection surface of the image.

2. The lighting device according to claim 1, further comprising:
wherein the microcomputer is further programmed to detect the horizontality of the housing with respect to the projection surface of the image, and control the display element to display the image including the one or more icons based upon the detected horizontality of the housing.

3. The lighting device according to claim 2, further comprising:
a camera configured to photograph the image projected by the projection type video image display unit, and
wherein the microcomputer is further programmed to detect the horizontality of the housing based on the photographed image from the camera.

4. The lighting device according to claim 2, further comprising:
a gravity sensor,
wherein the microcomputer is further programmed to detect the horizontality of the housing based on an output from the gravity sensor.

5. The lighting device according to claim 1,
wherein the image the one or more icons indicating respective adjustment directions of the one or more of the length adjusting members at positions corresponding to the one or more of the length adjusting members where adjustment of the horizontality of the housing is to be made.

6. The lighting device according to claim 5,
wherein the image includes icons of the one or more of the length adjusting members and the one or more icons indicating the respective adjustment directions of the one or more of the length adjusting members.

7. The lighting device according to claim 2,
wherein the image includes the one or more icons and an instruction to adjust the one or more of the length adjusting members.

8. The lighting device according to claim 7,
wherein the instruction is preliminarily settable.

9. A lighting device comprising:
a housing;
a lighting unit disposed in the housing and including one or more light emitting elements configured to emit illumination light; and
a projection type video image display unit disposed in the housing and including a display element and a projection optical system configured to project an image;
three or more wires connected to the housing at three or more points and configured to suspend the housing from a ceiling; and
two or more length adjusting members respectively connected to two of the wires, each of the length adjusting members configured to lengthen and shorten the respective one of the wires connected thereto,
wherein the two or more length adjusting members are configured to adjust horizontality of the housing, and
the projection type video image display unit includes a microcomputer programmed to control the display element to display the image including one or more icons indicating respective adjustment directions of one or more of the length adjusting members to guide adjustment of the horizontality of the housing with respect to a projection surface of the image.

10. The lighting device according to claim 1,
wherein the housing includes a rotation disc configured to adjust a rotational position of the housing, and the three or more wires are connected to the rotation disc at the three or more points.

* * * * *